US012591694B2

(12) United States Patent
Segal et al.

(10) Patent No.: US 12,591,694 B2
(45) Date of Patent: Mar. 31, 2026

(54) ELECTRONIC DEVICE INCLUDING ACCESS CONTROL IDENTIFIERS FOR CONTROLLING ACCESS TO PERIPHERALS

(71) Applicant: Microchip Technology Incorporated, Chandler, AZ (US)

(72) Inventors: Uri Segal, Hauppauge, NY (US); Richard Wahler, Saint James, NY (US); Artemas Speziale, Hauppauge, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 552 days.

(21) Appl. No.: 18/070,884

(22) Filed: Nov. 29, 2022

(65) Prior Publication Data

US 2023/0214507 A1 Jul. 6, 2023

Related U.S. Application Data

(60) Provisional application No. 63/295,962, filed on Jan. 3, 2022.

(51) Int. Cl.
| | |
|---|---|
| *G06F 21/60* | (2013.01) |
| *G06F 9/00* | (2006.01) |
| *G06F 12/0831* | (2016.01) |
| *G06F 13/10* | (2006.01) |
| *G06F 21/85* | (2013.01) |

(52) U.S. Cl.
CPC ............. *G06F 21/604* (2013.01); *G06F 9/00* (2013.01); *G06F 12/0835* (2013.01); *G06F 13/10* (2013.01); *G06F 21/85* (2013.01)

(58) Field of Classification Search
CPC .......... G06F 21/604; G06F 21/85; G06F 9/00; G06F 13/10; G06F 12/0835
See application file for complete search history.

(56) References Cited

U.S. PATENT DOCUMENTS

| | | | |
|---|---|---|---|
| 7,143,225 B1 * | 11/2006 | Tischler .............. | G06F 13/4234 710/305 |
| 2003/0172214 A1 | 9/2003 | Moyer et al. ................. | 710/200 |
| 2004/0177266 A1 | 9/2004 | Moyer et al. ................. | 713/189 |
| 2009/0144465 A1 * | 6/2009 | Sato ........................ | G06F 21/78 710/37 |
| 2022/0066839 A1 * | 3/2022 | Behl ..................... | G06F 9/5061 |

OTHER PUBLICATIONS

International Search Report and Written Opinion, Application No. PCT/US2022/053762, 11 pages, Apr. 26, 2023.

* cited by examiner

*Primary Examiner* — Ellen Tran
(74) *Attorney, Agent, or Firm* — SLAYDEN GRUBERT BEARD PLLC

(57) ABSTRACT

An electronic device includes a transaction host, a first peripheral, a second peripheral, a first access controller connected to the first peripheral, a second access controller connected to the second peripheral, and an access control register storing a first access control identifier for the first peripheral and a second access control identifier for the second peripheral. The first access controller to receive an access request for access to the first peripheral by the transaction host, perform an access determination for the first peripheral based at least on the first access control identifier for the first peripheral, and allow or prevent the transaction host access to the first peripheral based on the access determination.

18 Claims, 11 Drawing Sheets

500

IN ELECTRONIC DEVICE INCLUDING A TRANSACTION HOST, A FIRST PERIPHERAL, A SECOND PERIPHERAL, AND AN ACCESS CONTROL REGISTER, STORING IN THE ACCESS CONTROL REGISTER (A) A FIRST ACCESS CONTROL IDENTIFIER FOR THE FIRST PERIPHERAL AND (B) A SECOND ACCESS CONTROL IDENTIFIER FOR THE SECOND PERIPHERAL — 502

RECEIVE, BY FIRST ACCESS CONTROLLER ASSOCIATED WITH THE FIRST PERIPHERAL, A REQUEST FOR ACCESS TO THE FIRST PERIPHERAL BY THE TRANSACTION HOST. THE ACCESS REQUEST MAY OPTIONALLY INCLUDE AN OPERATING MODE SIGNAL INDICATING A PRIVILEGED MODE OR A USER MODE OF THE TRANSACTION HOST — 504

ACCESS, BY THE FIRST ACCESS CONTROLLER FROM THE ACCESS CONTROL REGISTER, A FIRST ACCESS CONTROL IDENTIFIER FOR THE FIRST PERIPHERAL — 506

PERFORM ACCESS DETERMINATION, BY THE FIRST ACCESS CONTROLLER, TO ALLOW OR PREVENT ACCESS TO THE FIRST PERIPHERAL BASED AT LEAST ON THE FIRST ACCESS CONTROL IDENTIFIER FOR THE FIRST PERIPHERAL (AND IN SOME EXAMPLES ALSO BASED ON THE OPTIONAL OPERATING MODE SIGNAL) — 508

ALLOW OR PREVENT ACCESS TO THE FIRST PERIPHERAL BASED ON THE ACCESS DETERMINATION — 510

108a

108b

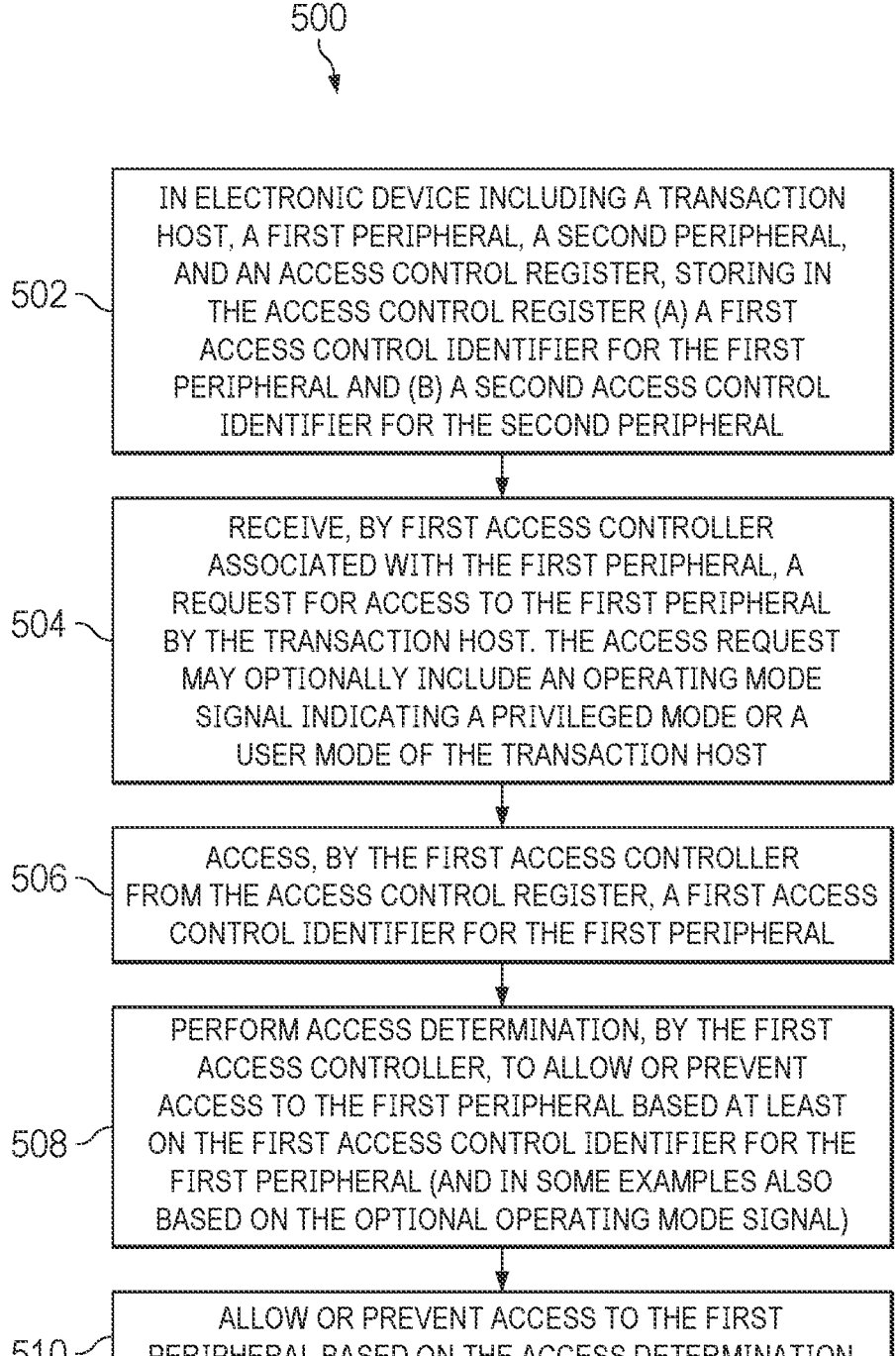

500

502 — IN ELECTRONIC DEVICE INCLUDING A TRANSACTION HOST, A FIRST PERIPHERAL, A SECOND PERIPHERAL, AND AN ACCESS CONTROL REGISTER, STORING IN THE ACCESS CONTROL REGISTER (A) A FIRST ACCESS CONTROL IDENTIFIER FOR THE FIRST PERIPHERAL AND (B) A SECOND ACCESS CONTROL IDENTIFIER FOR THE SECOND PERIPHERAL

504 — RECEIVE, BY FIRST ACCESS CONTROLLER ASSOCIATED WITH THE FIRST PERIPHERAL, A REQUEST FOR ACCESS TO THE FIRST PERIPHERAL BY THE TRANSACTION HOST. THE ACCESS REQUEST MAY OPTIONALLY INCLUDE AN OPERATING MODE SIGNAL INDICATING A PRIVILEGED MODE OR A USER MODE OF THE TRANSACTION HOST

506 — ACCESS, BY THE FIRST ACCESS CONTROLLER FROM THE ACCESS CONTROL REGISTER, A FIRST ACCESS CONTROL IDENTIFIER FOR THE FIRST PERIPHERAL

508 — PERFORM ACCESS DETERMINATION, BY THE FIRST ACCESS CONTROLLER, TO ALLOW OR PREVENT ACCESS TO THE FIRST PERIPHERAL BASED AT LEAST ON THE FIRST ACCESS CONTROL IDENTIFIER FOR THE FIRST PERIPHERAL (AND IN SOME EXAMPLES ALSO BASED ON THE OPTIONAL OPERATING MODE SIGNAL)

510 — ALLOW OR PREVENT ACCESS TO THE FIRST PERIPHERAL BASED ON THE ACCESS DETERMINATION

FIG. 5

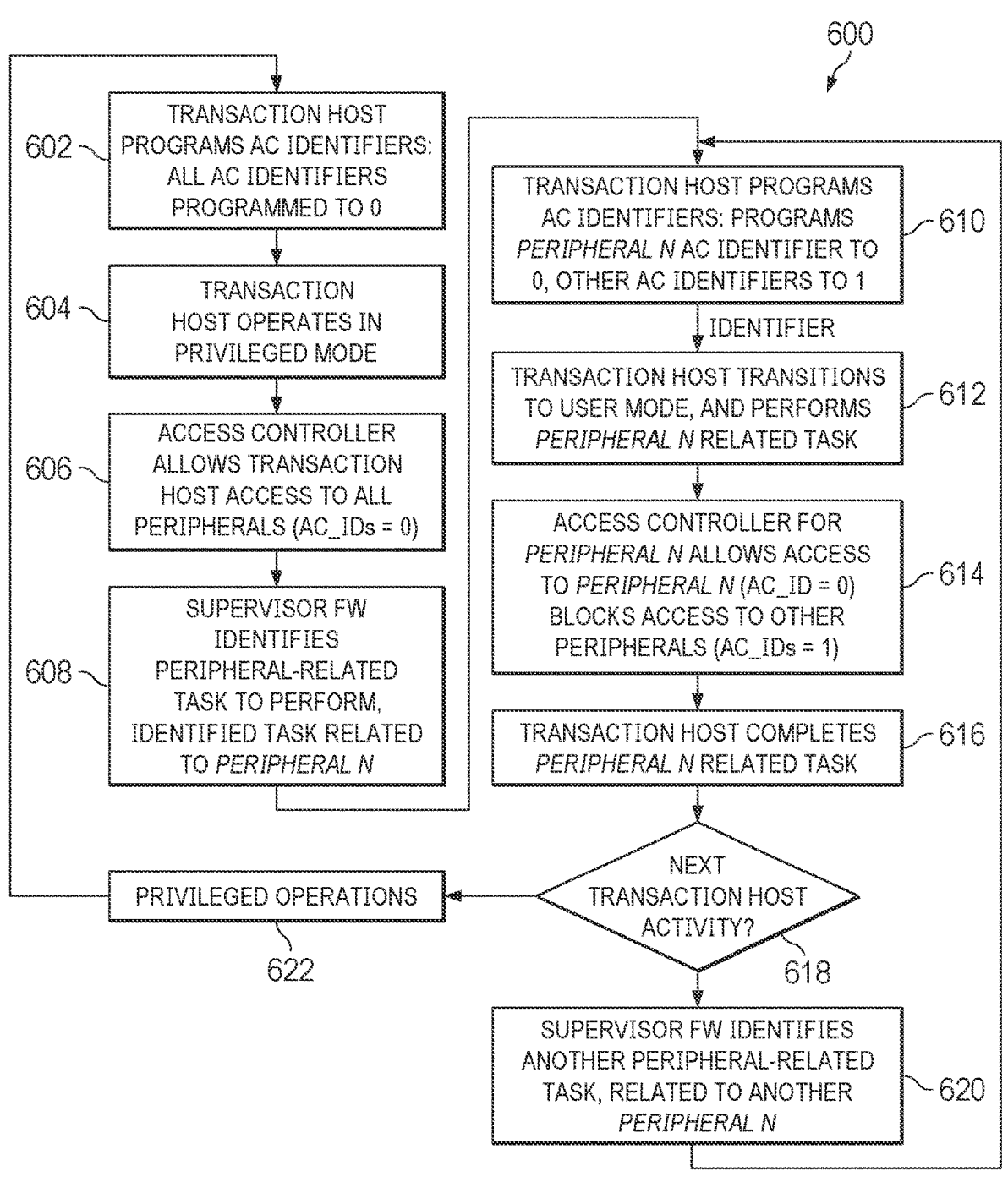

600

602 — TRANSACTION HOST PROGRAMS AC IDENTIFIERS: ALL AC IDENTIFIERS PROGRAMMED TO 0

604 — TRANSACTION HOST OPERATES IN PRIVILEGED MODE

606 — ACCESS CONTROLLER ALLOWS TRANSACTION HOST ACCESS TO ALL PERIPHERALS (AC_IDs = 0)

608 — SUPERVISOR FW IDENTIFIES PERIPHERAL-RELATED TASK TO PERFORM, IDENTIFIED TASK RELATED TO PERIPHERAL N

610 — TRANSACTION HOST PROGRAMS AC IDENTIFIERS: PROGRAMS PERIPHERAL N AC IDENTIFIER TO 0, OTHER AC IDENTIFIERS TO 1

IDENTIFIER

612 — TRANSACTION HOST TRANSITIONS TO USER MODE, AND PERFORMS PERIPHERAL N RELATED TASK

614 — ACCESS CONTROLLER FOR PERIPHERAL N ALLOWS ACCESS TO PERIPHERAL N (AC_ID = 0) BLOCKS ACCESS TO OTHER PERIPHERALS (AC_IDs = 1)

616 — TRANSACTION HOST COMPLETES PERIPHERAL N RELATED TASK

618 — NEXT TRANSACTION HOST ACTIVITY?

622 — PRIVILEGED OPERATIONS

620 — SUPERVISOR FW IDENTIFIES ANOTHER PERIPHERAL-RELATED TASK, RELATED TO ANOTHER PERIPHERAL N

TABLE 1

| AC IDENTIFIER | ALLOW ACCESS |
|---|---|
| 0 (ACCESS ALLOWED) | YES |
| 1 (ACCESS PREVENTED) | NO |

FIG. 6

TABLE 2

| AC IDENTIFIER | TRANSACTION HOST OPERATING MODE | ALLOW ACCESS TO PERIPHERAL? |
|---|---|---|
| 0 (OPEN ACCESS) | 0 (USER MODE) | YES |
| 0 (OPEN ACCESS) | 1 (PRIVILEGED MODE) | YES |
| 1 (RESTRICTED ACCESS) | 0 (USER MODE) | NO |
| 1 (RESTRICTED ACCESS) | 1 (PRIVILEGED MODE) | YES |

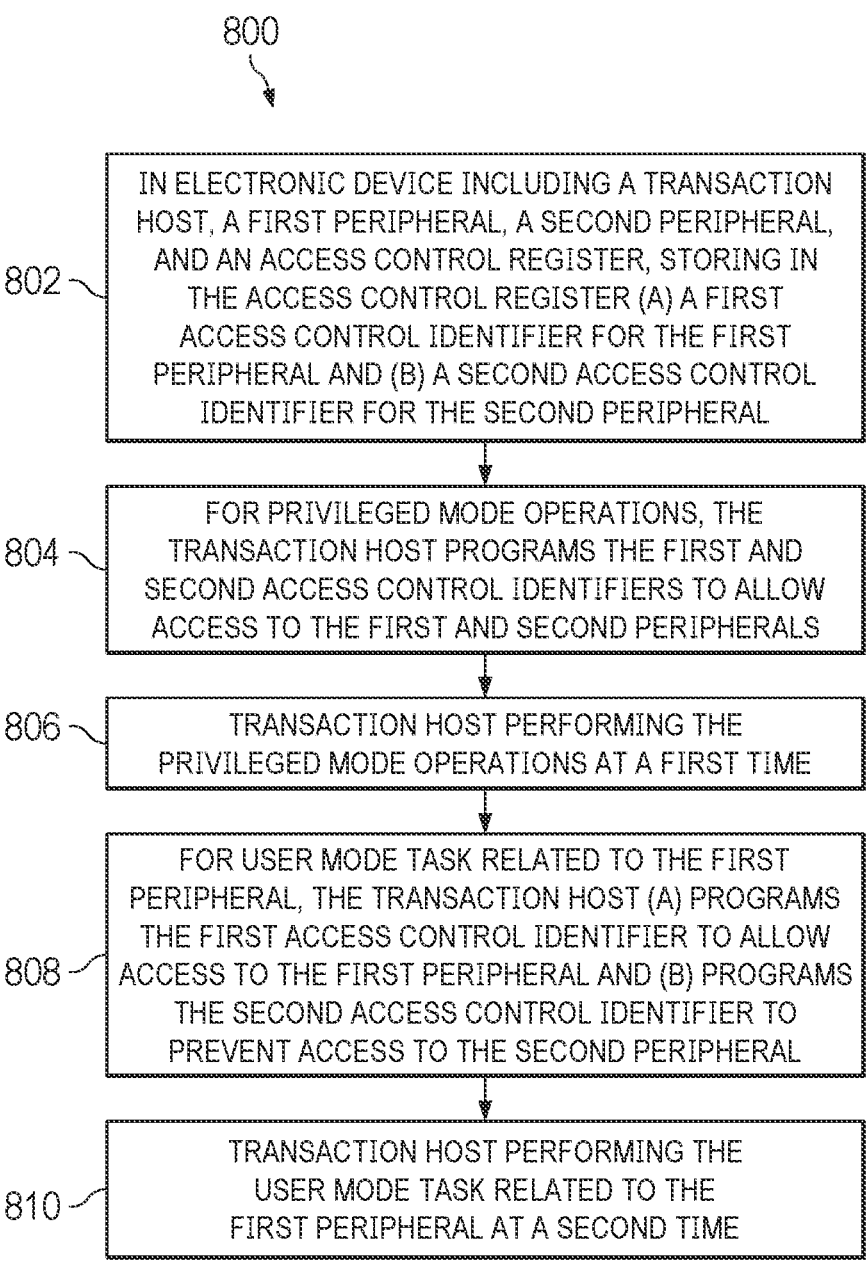

800

802 — IN ELECTRONIC DEVICE INCLUDING A TRANSACTION HOST, A FIRST PERIPHERAL, A SECOND PERIPHERAL, AND AN ACCESS CONTROL REGISTER, STORING IN THE ACCESS CONTROL REGISTER (A) A FIRST ACCESS CONTROL IDENTIFIER FOR THE FIRST PERIPHERAL AND (B) A SECOND ACCESS CONTROL IDENTIFIER FOR THE SECOND PERIPHERAL

804 — FOR PRIVILEGED MODE OPERATIONS, THE TRANSACTION HOST PROGRAMS THE FIRST AND SECOND ACCESS CONTROL IDENTIFIERS TO ALLOW ACCESS TO THE FIRST AND SECOND PERIPHERALS

806 — TRANSACTION HOST PERFORMING THE PRIVILEGED MODE OPERATIONS AT A FIRST TIME

808 — FOR USER MODE TASK RELATED TO THE FIRST PERIPHERAL, THE TRANSACTION HOST (A) PROGRAMS THE FIRST ACCESS CONTROL IDENTIFIER TO ALLOW ACCESS TO THE FIRST PERIPHERAL AND (B) PROGRAMS THE SECOND ACCESS CONTROL IDENTIFIER TO PREVENT ACCESS TO THE SECOND PERIPHERAL

810 — TRANSACTION HOST PERFORMING THE USER MODE TASK RELATED TO THE FIRST PERIPHERAL AT A SECOND TIME

FIG. 8

ELECTRONIC DEVICE INCLUDING ACCESS CONTROL IDENTIFIERS FOR CONTROLLING ACCESS TO PERIPHERALS

RELATED PATENT APPLICATION

This application claims priority to commonly owned U.S. Provisional Patent Application No. 63/295,962 filed Jan. 3, 2022, the entire contents of which are hereby incorporated by reference for all purposes.

TECHNICAL FIELD

The present disclosure relates to electronic devices including peripherals, and more particularly to an electronic device including access control identifiers for controlling access to peripherals.

BACKGROUND

A system on a chip, also known as a system-on-chip or SoC, is an integrated circuit (IC) that integrates an electronic system or computer system on a single chip. An SoC typically includes at least one processor, e.g., central processing unit (CPU), microcontroller, or microprocessor (MPU), and various peripherals devices, for example input/output ports, internal memory, as well as analog input and output blocks, for example radio modems, a graphics processing unit (GPU), and/or one or more coprocessors, all on a single substrate or microchip. An SoC can be designed for various functions, for example signal processing, wireless communication, or artificial intelligence.

In some SoC's, firmware running on the processor has complete access to all peripherals on the SoC, regardless of the current operating mode of the processor, for example a privileged mode or a user mode. This can result in faults or other unwanted consequences. For example, a faulty or malicious firmware device driver corresponding with one peripheral can mistakenly (or maliciously) access and corrupt another peripheral, e.g., by altering registers provided in the other peripheral.

There is a need for improved, low-cost access control for peripherals provided in an SoC or other electronic device, for example to protect the peripherals from faulty or malicious firmware.

SUMMARY

Systems and methods are provided for controlling access to peripherals in an electronic device (e.g., an SoC or other electronic device), for example to protect peripherals from mistaken or malicious access. Some examples provide programmable (e.g., updatable) access control identifiers corresponding with respective peripherals and respective access controllers for controlling access to respective peripherals based at least on the access control identifiers. An access control identifier may include one or more bits, referred to herein as access control bits. The access control identifiers may be used to protect peripherals during execution of user-space tasks, e.g., device driver operations associated with a selected peripheral. For example, to execute a respective task (e.g., a device driver operation) related to a selected peripheral, a transaction host (e.g., a processor) may execute supervisor firmware or other supervisor code to program (e.g., set or update) respective access control identifiers in an access control register to (a) allow the respective task to access the selected peripheral and (b) prevent the respective task from accessing other peripherals, for example to prevent the respective task from mistakenly or maliciously accessing registers in any of the other peripherals. In some examples, the access controller may enable the transaction host (e.g., processor) to program, e.g., set or update, the respective access control identifiers to allow supervisor code access to all peripherals during a privileged mode operation, e.g., an execution of relevant supervisor firmware.

In some examples, respective bitmasks are stored for respective tasks (e.g., device driver operations), wherein the bitmask for a respective task indicates respective access settings for respective peripherals for performing the respective task. Before executing a respective task, the transaction host may access the bitmask associated with the respective task, and program (e.g., sets or update) respective access control identifiers in the access control register. The programmed respective access control identifiers are accessible and usable by access controllers associated with respective peripherals to control access to the respective peripherals during execution of the respective task.

In some applications, the access control identifiers and access controller may eliminate a need for complex software, thus allowing for a smaller or less expensive processors, e.g., in an SoC.

One aspect provides an electronic device includes a transaction host, a first peripheral, a second peripheral, a first access controller connected to the first peripheral, a second access controller connected to the second peripheral, and an access control register storing a first access control identifier for the first peripheral and a second access control identifier for the second peripheral. The first access controller to receive an access request for access to the first peripheral by the transaction host, perform an access determination for the first peripheral based at least on the first access control identifier for the first peripheral, and allow or prevent the transaction host access to the first peripheral based on the access determination.

In some examples, the transaction host comprises a processor or a direct memory access (DMA) engine.

In some examples, the transaction host comprises a bridge to receive requests from an external host separate from the electronic device to access the first peripheral.

In some examples, the first access control identifier includes one or more first access control bits, and the second access control identifier includes one or more second access control bits.

In some examples, the electronic device comprises firmware executable by the transaction host to program at least one of the first access control identifier and the second access control identifier based on an operating mode of the transaction host.

In some examples, the electronic device comprises firmware executable by the transaction host to dynamically program at least one of the first access control identifier for the first peripheral and the second access control identifier for the second peripheral between (a) an access-allowed setting allowing access to the respective peripheral by the transaction host and (b) an access-prevented setting preventing access to the respective peripheral by the transaction host.

In some examples, the electronic device comprises firmware executable by the transaction host to program the first and second access control identifiers, including (a) for a privileged mode operation of the transaction host, to program both the first and second access control identifiers to an access-allowed setting to allow access to both the first peripheral and the second peripheral by the transaction host;

(b) for a first user mode operation of the transaction host to perform operations related to the first peripheral, to program the first access control identifier to the access-allowed setting to allow access to the first peripheral and to program the second access control identifier to an access-prevented setting to prevent access to the second peripheral; and (c) for a second user mode operation of the transaction host to perform operations related to the second peripheral, to program the first access control identifier to the access-prevented setting to prevent access to the first peripheral and to program the second access control identifier to an access-allowed setting to allow access to the second peripheral.

In some examples, the access controller to perform an access determination for the first peripheral based at least on (a) the peripheral-specific access control identifier for the first peripheral and (b) an operating mode signal indicating either a privileged mode of the transaction host or a user mode of the transaction host.

In some examples, the first access control identifier for the first peripheral and the second access control identifier for the second peripheral respectively indicate either (a) a restricted access setting to allow access to the respective peripheral only in the privileged mode of the transaction host, or (b) an open access setting to allow access to the respective peripheral in both the privileged mode of the transaction host and the user mode of the transaction host.

In some examples, the electronic device comprises firmware executable by the transaction host to program at least one of the first access control identifier and the second access control identifier between the restricted access setting and the open access setting.

In some examples, the access controller to (a) determine to allow access to the first peripheral if the first access control identifier for the first peripheral indicates the open access setting, and an operating mode signal indicates the privileged mode of the transaction host; (b) determine to allow access to the first peripheral if the first access control identifier for the first peripheral indicates the open access setting, and the operating mode signal indicates the user mode of the transaction host; (c) determine to allow access to the first peripheral if the first access control identifier for the first peripheral indicates the restricted access setting, and the operating mode signal indicates the privileged mode of the transaction host; and (d) determine to prevent access to the first peripheral if the first access control identifier for the first peripheral indicates the restricted access setting, and the operating mode signal indicates the user mode of the transaction host.

In some examples, the transaction host is selectively operatable in a privileged mode and a user mode, and at least one of the first access control identifier and the second access control identifier is programmable only in the privileged mode of the transaction host.

In some examples, the electronic device comprises firmware running on the transaction host, and wherein the allowance of, or preventing of, access to the first peripheral comprises allowance, or preventing, of access to the first peripheral by the firmware running on the transaction host.

In some examples, the access control register is provided in a designated peripheral of the multiple peripherals.

In some examples, the electronic device comprises an additional transaction host, wherein the first access control identifier and the second access control identifier are associated with the transaction host, wherein the access control register stores a third access control identifier for the first peripheral and associated with the additional transaction host, and a fourth access control identifier for the second peripheral and associated with the additional transaction host. The access controller to receive an additional access request for access to the first peripheral by the additional transaction host; perform an additional access determination for the first peripheral based on (a) an access request identifier identifying the additional transaction host, and (b) the third access control identifier; and allow or prevent access to the first peripheral by the additional transaction host based on the additional access determination.

In some examples, the electronic device is a system on a chip (SoC) device.

Another aspect provides a method including, in an electronic device including a transaction host, a first peripheral and a second peripheral, and an access control register, storing in the access control register (a) a first access control identifier for the first peripheral and (b) a second access control identifier for the second peripheral. A first access controller associated with the first peripheral receives a request for access to the first peripheral by the transaction host. The first access controller performs an access determination to allow or prevent access to the first peripheral based at least on the first access control identifier for the first peripheral, and allows or prevents access to the first peripheral based on the access determination.

In some examples, the method includes executing firmware, by the transaction host, to program at least one of the first access control identifier and the second access control identifier based on an operating mode of the transaction host.

In some examples, the method includes executing firmware, by the transaction host, to dynamically program at least one of the first access control identifier for the first peripheral and the second access control identifier for the second peripheral between (a) an access-allowed setting allowing access to the respective peripheral by the transaction host and (b) an access-prevented setting preventing access to the respective peripheral by the transaction host.

In some examples, the method includes executing firmware, by the transaction host, to program the first and second access control identifiers, including (a) for a privileged mode operation of the transaction host, setting both the first and second access control identifiers to an access-allowed setting respectively allowing access to both the first peripheral and the second peripheral by the transaction host; (b) for a first user mode operation of the transaction host for performing operations related to the first peripheral, setting the first access control identifier to the access-allowed setting and setting the second access control identifier to an access-prevented setting preventing access to the second peripheral; and (c) for a second user mode operation of the transaction host for performing operations related to the second peripheral, setting the first access control identifier to the access-prevented setting and setting the second access control identifier to an access-allowed setting.

In some examples, the method includes performing the access determination, by the first access controller, to allow or prevent access to the first peripheral based at least on (a) the first access control identifier for the first peripheral and (b) an operating mode signal indicating either a privileged mode of the transaction host or a user mode of the transaction host.

In some examples, the first access control identifier for the first peripheral and the second access control identifier for the second peripheral respectively indicate either (a) a restricted access setting preventing access to the respective peripheral in the user mode of the transaction host, or (b) an open access setting allowing access to the respective peripheral in both the privileged mode of the transaction host and the user mode of the transaction host.

In some examples, the method includes executing firmware by the transaction host to dynamically program at least one of the first access control identifier and the second access control identifier between the restricted access setting and the open access setting.

In some examples, performing the access determination to allow or prevent access to the first peripheral comprises (a) allowing access to the first peripheral if the peripheral-specific access control identifier for the first peripheral indicates the open access setting, and the operating mode signal indicates the privileged mode of the transaction host; (b) allowing access to the first peripheral if the first access control identifier for the first peripheral indicates the open access setting, and the operating mode signal indicates the user mode of the transaction host; (c) allowing access to the first peripheral if the first access control identifier for the first peripheral indicates the restricted access setting, and the operating mode signal indicates the privileged mode of the transaction host; and (d) preventing access to the first peripheral if the first access control identifier for the first peripheral indicates the restricted access setting, and the operating mode signal indicates the user mode of the transaction host.

In some examples, the method includes allowing programming of the first access control identifier in a privileged mode of the transaction host, and preventing programming of the first access control identifier in a user mode of the transaction host.

Another aspect provides a method including, in an electronic device including a transaction host, a first peripheral and a second peripheral, and an access control register, storing in the access control register a first access control identifier for the first peripheral and a second access control identifier for the second peripheral. The transaction host sets the first access control identifier and the second access control identifier to allow access to the first peripheral and the second peripheral, respectively, and the transaction host performs a privileged mode operation at a first time. Subsequently, the transaction host sets (a) the first access control identifier to allow access to the first peripheral by the transaction host and (b) the second access control identifier to prevent access to the second peripheral by the transaction host, and performs a user mode operation related to the first peripheral at a second time.

In some examples, the transaction host sets (a) the first access control identifier to prevent access to the first peripheral by the transaction host and (b) the second access control identifier to allow access to the second peripheral by the transaction host, and performs a user mode operation related to the second peripheral at a third time.

Another aspect provides an electronic device includes a first peripheral, a second peripheral, a non-transitory memory, an access control register, a transaction host, a first access controller, and a second access controller. The non-transitory memory stores: (a) supervisor firmware including access control identifier management instructions, (b) computer-readable code including a first task related to the first peripheral, and (c) a first bitmask corresponding with the first task, the first bitmask indicating respective access settings for the first peripheral and the second peripheral for performing the first task. The access control register includes a first access control identifier for the first peripheral and a second access control identifier for the second peripheral. The transaction host to execute the access control identifier management instructions in the supervisor firmware to program the first and second access control identifiers in the access control register based on the first bitmask corresponding with the first task, and after programming the first and second access control identifiers in the access control register based on the first bitmask, execute the first task related to the first peripheral. The first access controller to control access to the first peripheral based at least on the first access control identifier in the access control register programmed based on the first bitmask, and the second access controller to control access to the second peripheral based at least on the second access control identifier in the access control register programmed based on the first bitmask.

In some examples, the electronic device is a system on a chip (SoC) device.

In some examples, the transaction host comprises a processor or a direct memory access (DMA) engine.

In some examples, the first bitmask and the second bitmask are stored in a bitmask data structure in the non-transitory memory.

In some examples, the first bitmask includes one or more first bitmask bits indicating an access setting for the first peripheral for performing the first task and one or more second bitmask bits indicating an access setting for the second peripheral for performing the first task, and the first access control identifier includes one or more first access control bits, and the second access control identifier includes one or more second first access control bits.

In some examples, the computer-readable code comprises a second task related to the second peripheral; the non-transitory memory stores a second bitmask corresponding with the second task, the second bitmask indicating respective access settings for the first peripheral and the second peripheral for performing the second task; and the transaction host to (a) execute the access control identifier management instructions in the supervisor firmware to program the first and second access control identifiers in the access control register based on the second bitmask corresponding with the second task, and (b) after programming the first and second access control identifiers in the access control register based on the second bitmask, execute the second task related to the second peripheral.

In some examples, the non-transitory memory includes a non-privileged portion storing the computer-readable code including the first task and the second task, and a privileged portion storing the supervisor firmware including the access control identifier management instructions, and the first bitmask corresponding with the first task.

In some examples, the access controller to receive an access request from the transaction host for access to the first peripheral for executing the first task; perform an access determination for the first peripheral based at least on the first access control identifier programmed based on the first bitmask corresponding with the first task; and allow or prevent the transaction host access to the first peripheral based on the access determination.

In some examples, the first access controller to perform the access determination for the first peripheral based at least on (a) the first access control identifier programmed by the transaction host based on the first bitmask corresponding with the first task and (b) an operating mode signal indicating either a privileged mode of the transaction host or a user mode of the transaction host.

In some examples, the first bitmask corresponding with the first task indicates (a) the first task is assigned peripheral access permission to the first peripheral and (b) the first task is not assigned peripheral access permission to the second peripheral.

In some examples, the first bitmask corresponding with the first task indicates (a) the first task is assigned peripheral access permission to the first peripheral and (b) the first task is not assigned peripheral access permission to the second peripheral. The access control identifier management instructions to program the first and second access control identifiers in the access control register based on the first bitmask before execution of the first task, including (a) programming the first access control identifier to an access-allowed value allowing access to the first peripheral during execution of the first task and (b) programming the second access control identifier to an access-prevented value preventing access to the second peripheral during execution of the first task. The first access controller to allow access to the first peripheral during execution of the first task based on the access-allowed value of the first access control identifier, and the second access controller to prevent access to the second peripheral during execution of the first task based on the access-prevented value of the second access control identifier.

In some examples, the transaction host selectively operates in a privileged mode and a user mode; and the first bitmask corresponding with the first task indicates (a) the first task is assigned peripheral access permission to the first peripheral and (b) the first task is not assigned peripheral access permission to the second peripheral. The access control identifier management instructions to program the first and second access control identifiers in the access control register based on the first bitmask before execution of the first task, including (a) programming the first access control identifier to an open-access setting for the first peripheral allowing access to the first peripheral in both the privileged mode and the user mode of the transaction host; and (b) programming the second access control identifier to a restricted access value for the second peripheral allowing access to the second peripheral in the privileged mode but not in the user mode of the transaction host.

In some examples, the access control register is provided in a third peripheral.

Another aspect provides a method. The method includes, in an electronic device including a transaction host, a first peripheral, a second peripheral and an access control register including a first access control identifier for the first peripheral and a second access control identifier for the second peripheral, storing (a) computer-readable code including a first task related to the first peripheral, and (b) a first bitmask corresponding with the first task, the first bitmask indicating respective access settings for the first peripheral and the second peripheral for performing the first task. The transaction host, before executing the first task, executes access control identifier management instructions to program the first and second access control identifiers in the access control register based on the first bitmask corresponding with the first task. After programming the first and second access control identifiers in the access control register based on the first bitmask, the transaction host executes the first task related to the first peripheral. During execution of the first task: a first access controller associated with the first peripheral controlling access to the first peripheral based at least on the first access control identifier in the access control register programmed based on the first bitmask, and a second access controller associated with the second peripheral controlling access to the second peripheral based at least on the second access control identifier in the access control register programmed based on the first bitmask.

In some examples, the method includes storing computer-readable code including a second task related to the second peripheral, and storing a second bitmask corresponding with the second task, the second bitmask indicating respective access settings for the first peripheral and the second peripheral for performing the second task. The transaction host, before executing the second task, executes the access control identifier management instructions to program the first and second access control identifiers in the access control register based on the second bitmask corresponding with the second task. After programming the first and second access control identifiers in the access control register based on the second bitmask, the transaction host executes the second task related to the second peripheral. During execution of the second task: the first access controller associated with the first peripheral controlling access to the first peripheral based at least on the first access control identifier in the access control register programmed based on the second bitmask, and the second access controller associated with the second peripheral controlling access to the second peripheral based at least on the second access control identifier in the access control register programmed based on the second bitmask.

In some examples, the first access controller controlling access to the first peripheral based at least on the first access control identifier programmed based on the first bitmask comprises the first access controller: receiving an access request from the transaction host for access to the first peripheral for executing the first task; performing an access determination for the first peripheral based at least on the first access control identifier programmed based on the first bitmask; and allowing or preventing the transaction host access to the first peripheral based on the access determination.

In some examples, the method includes the first access controller performing the access determination for the first peripheral based at least on (a) the first access control identifier programmed based on the first bitmask and (b) an operating mode signal indicating either a privileged mode of the transaction host or a user mode of the transaction host.

In some examples, the first bitmask corresponding with the first task indicates (a) the first task is assigned peripheral access permission to the first peripheral and (b) the first task is not assigned peripheral access permission to the second peripheral. Executing the access control identifier management instructions to program the first and second access control identifiers in the access control register based on the first bitmask corresponding with the first task comprises (a) programming the first access control identifier to an access-allowed value allowing access to the first peripheral during execution of the first task and (b) programming the second access control identifier to an access-prevented value preventing access to the second peripheral during execution of the first task. During execution of the first task: the first access controller associated with the first peripheral allowing access to the first peripheral based on the access-allowed value of the first access control identifier, and the second access controller associated with the second peripheral preventing access to the second peripheral based on the access-prevented value of the second access control identifier.

In some examples, the transaction host selectively operates in a privileged mode and a user mode, and the first bitmask corresponding with the first task indicates (a) the first task is assigned peripheral access permission to the first peripheral and (b) the first task is not assigned peripheral access permission to the second peripheral. Executing the access control identifier management instructions to program the first and second access control identifiers in the access control register based on the first bitmask corresponding with the first task comprises (a) programming the first access control identifier to an open-access value for the first peripheral allowing access to the first peripheral in both the privileged mode and the user mode of the transaction host and (b) programming the second access control identifier to a restricted access value for the second peripheral allowing access to the second peripheral in the privileged mode but not in the user mode of the transaction host. During execution of the first task: the first access controller associated with the first peripheral allowing access to the first peripheral in both the privileged mode and the user mode of the transaction host, based on the open-access value of the first access control identifier, and the second access controller associated with the second peripheral preventing access to the second peripheral in the privileged mode of the transaction host but not in the user mode of the transaction host, based on the restricted access value of the second access control identifier.

BRIEF DESCRIPTION OF THE DRAWINGS

Example aspects of the present disclosure are described below in conjunction with the figures, in which:

FIG. 5 is a flowchart of an example method for controlling access to peripherals in an electronic device using access control identifiers stored in an access control register;

FIG. 6 is a flowchart of an example method for controlling access to peripherals in an electronic device, using a first example access control identifier scheme;

FIG. 8 is a flowchart of an example method for controlling access to peripherals in an electronic device for both privilege mode operations and user mode operations, according to one example.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
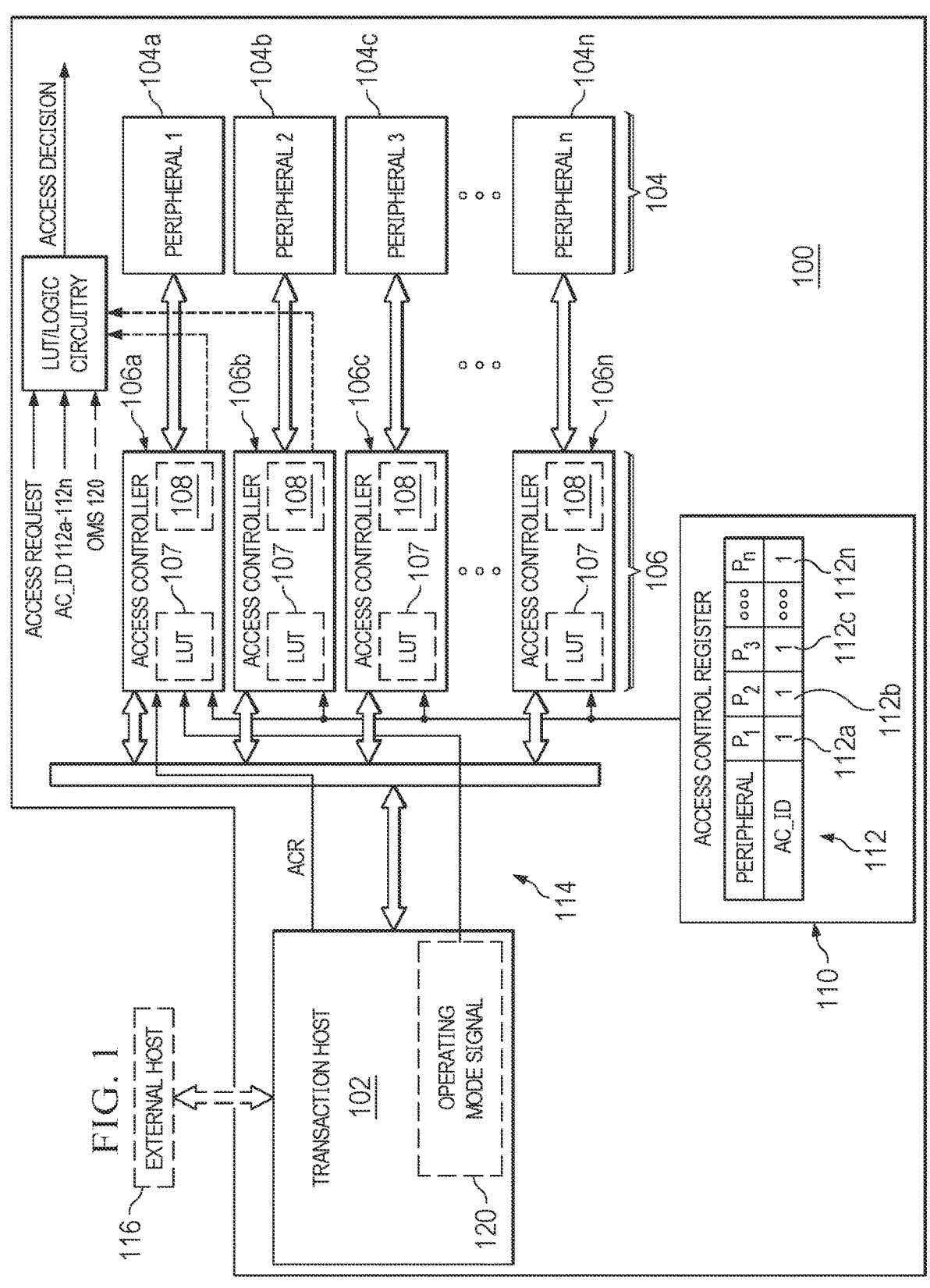
FIG. 1 illustrates an example electronic device (e.g., an SoC) that utilizes access control identifiers to control access to peripherals, according to one example.

FIG. 1 illustrates an example electronic device 100 that utilizes access control identifiers to control access to peripherals, according to one example, which access control identifiers may be programmable, e.g., the respective access control identifiers may be set and/or updated over time. The electronic device 100 includes a transaction host 102, peripherals 104, access controllers 106, and an access control register 110 storing access control identifiers 112. Components of electronic device 100 may be communicatively connected to each other by any type or types of communication links 114, e.g., busses, wires, or other type of links. In some examples, access controllers 106 may be connected between a bus and respective peripherals 104, or alternatively may be indirectly connected to the bus and operable to make access determinations for selected communications with peripherals 104a-104n connected to the bus.

In some examples, electronic device 100 is a system on a chip (SoC) device. In other examples, electronic device 100 may be a multi-chip system including transaction host 102 provided on one chip and peripherals 104 provided on separate chip(s). Transaction host 102 may comprise any device capable to initiate the execution of tasks related to respective peripherals 104, for example to access registers provided in respective peripherals 104. For example, transaction host 102 may comprise a processor, e.g., a microprocessor, microcontroller, central processing unit (CPU), processor core(s), a direct memory access (DMA) engine, or any other type of computer processor. As another example, transaction host 102 may comprise a bridge connected to an external host 116 (e.g., comprising a processor separate from the electronic device 100) to allow the external host 116 access to at least one peripheral 104.

Peripherals 104 (e.g., including input/output devices and/or other peripheral devices) may include any devices that provides input, output, or data storage functionality for the electronic device 100, for example one or more PCI Express interface, Ethernet interface, USB interface, I²C (Inter-Integrated Circuit) interface, direct memory access (DMA) controller, interrupt controller, analog-to-digital converter (ADC), WI-FI interface, Bluetooth interface, Global System for Mobile Communications (GSM) interface, General Packet Radio Service (GPRS) interface, Global Positioning System (GPS) interface, 3G interface, 4G interface, 5G interface, universal asynchronous receiver-transmitter (UART), Controller Area Network Flexible Data-Rate (CAN-FD) interface, general-purpose input/output (GPIO) interface, display device interface, modems, graphics processing unit (GPU), or coprocessor.

Electronic device 100 may include any number of peripherals 104. The example electronic device 100 shown in FIG. 1 includes peripherals 104a-104n, but it should be understood that electronic device 100 may include any number of one or more peripherals.

Respective access controllers 106 may be connected to corresponding peripherals 104 for controlling (e.g., allowing or preventing) access to respective peripherals 104, e.g., by device drivers (firmware) executed by transaction host 102. For example, as discussed below with reference to FIG. 2, transaction host 102 may execute firmware to perform various tasks related to peripherals 104. For example, transaction host 102 may execute device drivers corresponding to respective peripherals 104a-104n to perform tasks (e.g., device driver tasks) related to the respective peripherals 104a-104n. Access controllers 106 may control (e.g., allow or prevent) access to respective peripherals 104 for respective tasks executed by transaction host 102.

As shown, electronic device 100 may include a respective access controller 106a-106n corresponding with a respective peripheral 104a-104n. For example, first access controller 106a may be connected between transaction host 102 and first peripheral 104a to control access to the first peripheral 104a by transaction host 102, second access controller 106b may be connected between transaction host 102 and second peripheral 104b to control access to the second peripheral 104b by transaction host 102, and so on. For example, the first access controller 106a may allow a first task (e.g., associated with a first device driver corresponding with the first peripheral 104a) to access the first peripheral 104a, and prevent a second task (e.g., associated with a second device driver corresponding with the second peripheral 104b) from accessing the first peripheral 104a. Similarly, the second access controller 106b may allow the second task (associated with the second device driver corresponding with the second peripheral 104b) to access the second peripheral 104b, and prevent the first task (associated with the first device driver corresponding with the first peripheral 104a) from accessing the second peripheral 104b.

Respective access controllers 106a-106n may include electronic circuitry to control (e.g., allow or prevent) access to respective peripherals 104a-104n by transaction host 102, based on a respective access control identifier 112 stored in access control register 110 and, in some alternative examples, additional access control input data. As discussed below, additional access control input data may include, for example, (a) an operating mode signal (OMS) 120 indicating an operating mode of the transaction host 102 and/or (b) an access request identifier (discussed below with reference to FIG. 3 relating to an example including multiple transaction hosts 102) identifying the respective transaction host 102 requesting access to a respective peripheral 104.

In some examples, access control identifiers (also referred to herein as "AC identifiers") 112 stored in access control register 110 include respective access control identifiers 112a-112n corresponding with respective peripherals 104a-104n, including a first access control identifier 112a corresponding with first peripheral 104a, a second access control identifier 112b corresponding with second peripheral 104b, and so on. Respective access control identifiers 112a-112n for respective peripherals 104a-104n may include one bit, multiple bits, or other data indicating an access setting for the respective peripherals 104a-104n. For example, the first access control identifier 112a may include one or multiple bits indicating an access setting for the first peripheral 104a, and the second access control identifier 112a may include one or multiple bits indicating an access setting for the second peripheral 104b. Access control register 110 may include a single register or multiple registers of any suitable size, e.g., including one or more 8-bit register, 32-bit register, or 64-bit register.

As discussed below with reference to FIG. 2, the transaction host 102 may program (e.g., set or update) the values of respective access control identifiers 112a-112n before performing respective tasks (e.g., firmware tasks) based on peripheral access permissions assigned to the respective tasks. As discussed below, electronic device 100 may store respective bitmasks for respective tasks indicating peripheral access permissions for the respective tasks, e.g., wherein a respective bitmask for a respective task indicates whether a respective task is assigned peripheral access permission to (or not assigned peripheral access permission to) respective peripherals 104a-104n. For example, electronic device 100 may store a first bitmask for a first task indicating the first task is assigned peripheral access permission to the first peripheral 104a but is not assigned peripheral access permission to the second peripheral 104b, and a second bitmask for a second task indicating the second task is assigned peripheral access permissions to the second peripheral 104b but is not assigned peripheral access permission to the first peripheral 104a. In some examples, peripheral access permissions may be assigned to a respective task (using a respective bitmask for the respective task) by a code developer (e.g., firmware developer), e.g., based on selected peripheral(s) that may be needed or utilized by the respective task. In some examples, a respective access controller 106a-106n associated with a respective peripheral 104a-104n makes access determinations for accessing the respective peripheral 104a-104n based on the respective access control identifier 112a-112n corresponding with the respective peripheral 104a-104n. In other examples, a respective access controller 106a-106n associated with a respective peripheral 104a-104n makes access determinations for accessing the respective peripheral 104a-104n based on (a) the respective access control identifier 112a-112n corresponding with the respective peripheral 104a-104n and (b) an operating mode signal 120 indicating a current operating mode (e.g., privileged mode or user mode) of the transaction host 102.

In other examples, multiple processing hosts 102 are provided, and a respective access controller 106a-106n associated with a respective peripheral 104a-104n makes access determinations for accessing the respective peripheral 104a-104n by a requesting transaction host 102 (or the multiple transaction hosts 102) based on (b) a transaction host identifier identifying the requesting transaction host 102, and (b) a respective access control identifier 112a-112n corresponding with the peripheral 104a-104n and with the respective requesting transaction host 102 (e.g., wherein the access control register 110 stores, for respective transaction hosts 102, a respective set of access control identifiers 112a-112n for peripherals 104a-104n). In other examples, multiple processing hosts 102 are provided, an a respective access controller 106a-106n associated with a respective peripheral 104a-104n makes access determinations for accessing the respective peripheral 104a-104n by a requesting transaction host 102 (or the multiple transaction hosts 102) based on (b) a transaction host identifier identifying the requesting transaction host 102, and (b) a respective access control identifier 112a-112n corresponding with the respective peripheral 104a-104n and with the requesting transaction host 102 (e.g., wherein the access control register 110 stores, for respective transaction hosts 102, a respective set of access control identifiers 112a-112n for peripherals 104a-104n), and (c) an operating mode signal 120 indicating a current operating mode (e.g., privileged mode or user mode) of the requesting transaction host 102.

In general, when transaction host 102 attempts to access a respective peripheral 104, for example first peripheral 104a, first access controller 106a may (a) receive an access request from transaction host 102 for access to first peripheral 104a; (b) access an access control identifier 112 for the first peripheral 104a from the access control register 110; (c) perform an access determination based on the first access control identifier 112a (and, in some examples, additional access control input data); and (d) allow or prevent access to first peripheral 104a by the transaction host 102 responsive to the access determination.

In a first example, as shown in Table 1 below, respective access control identifiers 112a-112n are programmable between the following access control identifier (AC_ID) values:

(a) an access-allowed setting (e.g., AC_ID value=[0]) allowing access to the respective peripheral 104a-104n by transaction host 102 (e.g., executing a device driver or other firmware) and (b) an access-prevented setting (e.g., AC_ID value=[1]) preventing access to the respective peripheral 104a-104n by transaction host 102 (e.g., executing a device driver or other firmware).

TABLE 1

| Access control identifier scheme for first example | |
| --- | --- |
| AC_ID value | Allow Access to Peripheral? |
| 0 (access-allowed) | Yes |
| 1 (access-prevented) | No |

In some examples respective access controller 106a-106n may store or have access to a lookup table (LUT) including the data of Table 1, which respective access controller 106a-106n can access for making access determinations. In some examples respective access controller 106a-106n may store a respective LUT in memory 107, e.g., a read-only memory (ROM) device (wherein a respective instance of memory 107 may be provided in respective access controllers 106a-106n or wherein memory 107 may be otherwise accessible to respective access controllers 106a-106n). In other examples, respective access controller 106a-106n may implement the decisions specified in Table 1 using suitable instances of logic circuitry 108. For example, as discussed below with reference to FIG. 4A, respective access controller 106a-106n may include logic circuitry 108 including a NOT gate (or inverter) for processing an access control identifier input to the respective access controller 106a-106n. (In another example, the meaning of the AC_ID values may be reversed, e.g., where AC_ID=0 indicates an access-prevented setting, and AC_ID=1 indicates an access-allowed setting, and the NOT gate may be omitted.)

Figure 2:
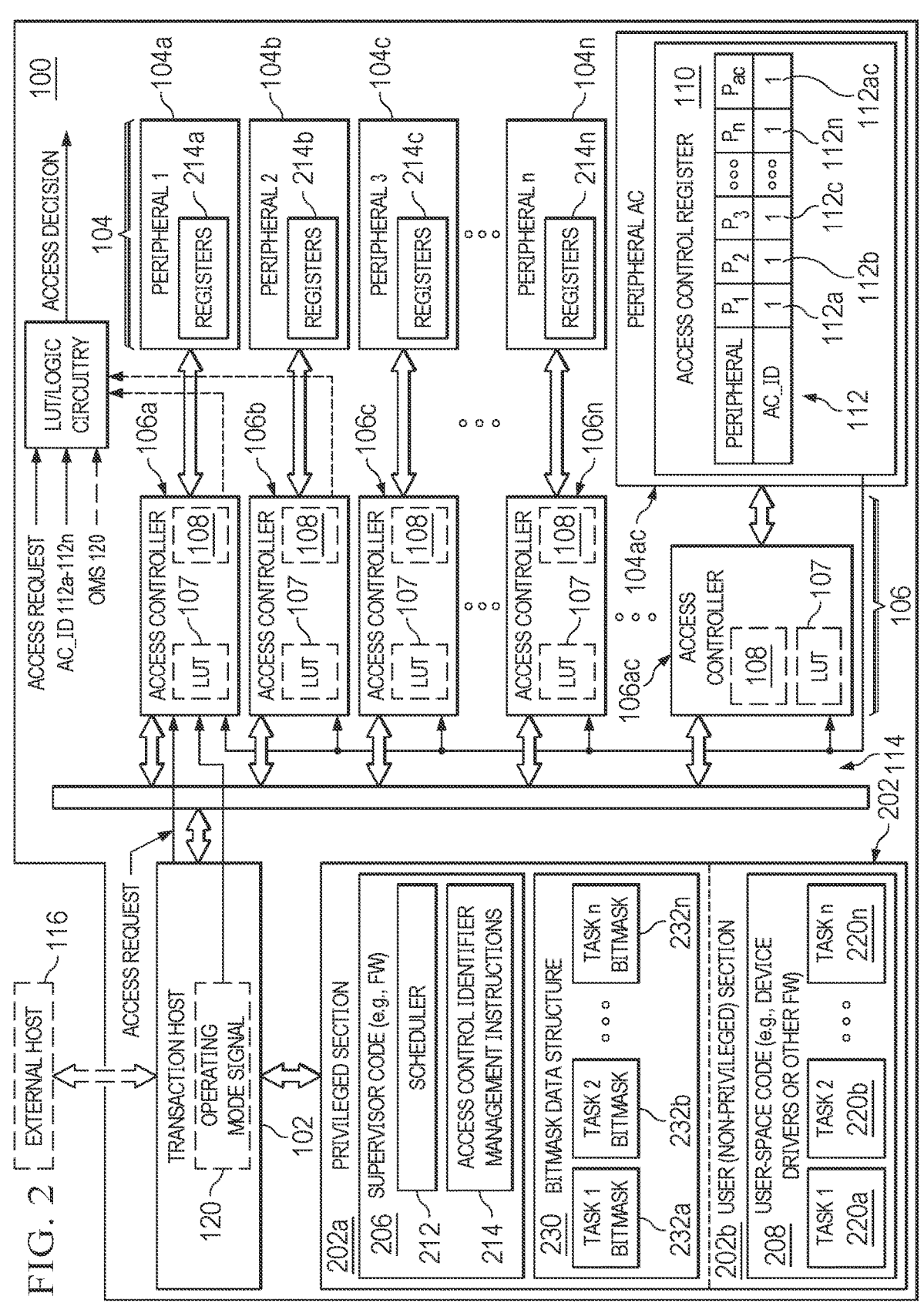
FIG. 2 illustrates additional aspects of the example electronic device of FIG. 1, according to one example.

In the first example (i.e., implementing the scheme shown in Table 1), transaction host 102 may execute respective firmware (e.g., access control identifier management instructions 214 provided in computer-readable supervisor code 206, e.g., embodied in firmware, as shown in FIG. 2 discussed below) to dynamically program access control identifiers 112a-112n according to the scheme described above, e.g., in real-time, based on the current operating mode of the transaction host (e.g., a privileged mode or a user mode) and/or before initiating tasks related to a specific peripheral 104a-104n (e.g., using a device driver corresponding with a specific peripheral 104a-104n). For example:

(a) before initiating privileged mode tasks related to any peripheral 104a-104n, transaction host 102 may program AC identifiers 112a-112n to 0 (allowing transaction host 102 access to peripherals 104a-104n)

(b) before initiating user mode tasks related to first peripheral 104a, transaction host 102 may program AC identifier 112a to 0 and program AC identifiers 112b . . . 112n to 1 (allowing transaction host 102 access to first peripheral 104a and preventing access to peripherals 104b 104n); and (c) before initiating user mode tasks related to second peripheral 104b, transaction host 102 may program AC identifier 112b to 0 and program AC identifiers 112a, 112c . . . 112n to 1 (allowing transaction host 102 access to second peripheral 104b and preventing access to peripherals 104a, 104c . . . 104n).

In the first example, a respective access controller 106a-106n associated with a specific peripheral 104a-104n makes access determinations for accessing the specific peripheral 104a-104n based on the current value of the respective access control identifier 112a-112n corresponding with the specific peripheral 104a-104n, e.g., without additionally needing an operating mode signal indicating the current operating mode of the transaction host 102. For example, when the first access controller 106a associated with first peripheral 104a receives an access request from transaction host 102 to access the first peripheral 104a, the first access controller 106a accesses the respective AC identifier 112a corresponding with first peripheral 104a, and based on the AC identifier 112a, allows transaction host 102 to access first peripheral 104a if the AC_ID value=0 and prevents transaction host 102 from accessing first peripheral 104a if the AC_ID value=1.

According to the scheme of the first example described above, in one example instance, the transaction host 102 may execute a first user-space task related to first peripheral 104a, using a first peripheral device driver corresponding with first peripheral 104a, and may thus program AC identifier 112a to 0 (e.g., using access control identifier management instructions 214 shown in FIG. 2) before executing the first task. If the first access controller 106a receives a request from the first peripheral device driver to access first peripheral 104a, the first access controller 106a may access AC identifier 112a, and responsive to AC identifier 112a value=0, allow access to first peripheral 104a. In another example instance, the transaction host 102 may execute a second user-space task related to second peripheral 104b, using a second peripheral device driver corresponding with second peripheral 104b, and may thus program AC identifier 112b to 0 to allow access to second peripheral 104b and program AC identifier 112a to 1 to prevent access to first peripheral 104a. If the first access controller 106a receives a request from the second peripheral device driver to access first peripheral 104a (e.g., a mistaken or malicious request from the second peripheral device driver), the first access controller 106a may access AC identifier 112a, and responsive to AC identifier 112a value=1, prevent access to first peripheral 104a. In still another example instance, the transaction host 102 may execute privileged tasks related to first peripheral 104a or second peripheral 104b (e.g., included in supervisor firmware), and may thus program AC identifier 112a to 0, or AC identifier 112b to 0, respectively, before executing such privileged tasks, to thereby allow access to first peripheral 104a by the first peripheral device driver corresponding with first peripheral 104a or the second peripheral device driver corresponding with second peripheral 104b.

In a second example, as shown in Table 2 below, each access control identifier 112a-112n is programmable between the following access control identifier (AC_ID) values:

(a) an open access setting (e.g., AC_ID value=[0]) allowing access to the respective peripheral 104a-104n by transaction host 102 (e.g., executing a device driver or other firmware) regardless of the current operating mode (e.g., privileged mode or user mode) of the transaction host 102, and (b) a restricted access setting (e.g., AC_ID value=[1]) allowing access to the respective peripheral 104a-104n by transaction host 102 (e.g., executing a device driver or other firmware) only in the privileged mode of the transaction host 102.

TABLE 2

| Access control identifier scheme for the second example. | | |
| --- | --- | --- |
| AC ID value | Transaction Host Operating mode | Allow Access to Peripheral? |
| 0 (open access) | 0 (user mode) | Yes |
| 0 (open access) | 1 (privileged mode) | Yes |

TABLE 2-continued

Access control identifier scheme for the second example.

| AC ID value | Transaction Host Operating mode | Allow Access to Peripheral? |
|---|---|---|
| 1 (restricted access) | 0 (user mode) | No |
| 1 (restricted access) | 1 (privileged mode) | Yes |

In some examples respective access controller 106a-106n may store or have access to a LUT including the data of Table 2, which respective access controller 106a-106n can access for making access determinations. In some examples respective access controller 106a-106n may store a respective LUT in a respective instance of memory 107, e.g., a read-only memory ROM) device (wherein an instance of memory 107 may be provided in respective access controllers 106a-106n or memory 107 may be otherwise accessible to respective access controllers 106a-106n). In other examples, respective access controller 106a-106n may implement the decisions specified in Table 2 using a respective instance of suitable logic circuitry 108. For example, as discussed below with reference to FIG. 4B, respective access controller 106a-106n may include logic circuitry 108 including a NOT gate and an OR gate for processing an access control identifier input to the respective access controller 106a-106n.

In the second example (i.e., implementing the scheme shown in Table 2), transaction host 102 may execute respective firmware (e.g., access control identifier management instructions 214 shown in FIG. 2) to dynamically program access control identifiers 112a-112n according to the scheme described above, e.g., in real-time, based on the current operating mode of the transaction host (e.g., a privileged mode or a user mode) and/or to initiate tasks related to a specific peripheral 104a-104n (e.g., using a device driver corresponding with a specific peripheral 104a-104n). For example:

(a) to initiate tasks related to first peripheral 104a (regardless of the operational mode of transaction host 102), transaction host 102 may program AC identifier 112a to 0 and program AC identifiers 112b, 112c . . . 112n to 1 (allowing transaction host 102 access to first peripheral 104a in both the privileged mode and user mode of transaction host 102, as discussed below, while preventing transaction host 102 access to peripheral 104b, 104c . . . 104n in the user mode of transaction host 102); and (b) to initiate tasks related to second peripheral 104b (regardless of the operational mode of transaction host 102), transaction host 102 may program AC identifier 112b to 0 and program AC identifiers 112a, 112c . . . 112n to 1 (allowing transaction host 102 access to second peripheral 104b in both the privileged mode and user mode of transaction host 102, as discussed below, while preventing transaction host 102 access to peripheral 104a, 104c . . . 104n in the user mode of transaction host 102).

In the second example, a respective access controller 106a-106n associated with a specific peripheral 104a-104n makes access determinations for accessing the specific peripheral 104a-104n based on (a) the current value of the respective access control identifier 112a-112n corresponding with the specific peripheral 104a-104n and (b) an operating mode signal 120 indicating an operating mode (privileged mode or user mode) of transaction host 102. For example, when the first access controller 106a associated with first peripheral 104a receives an access request from transaction host 102 to access the first peripheral 104a, the first access controller 106a accesses (a) AC identifier 112a corresponding with first peripheral 104a and (b) the operating mode signal 120, and determines whether to allow transaction host 102 to access first peripheral 104a based on the scheme defined by Table 2. In particular, first access controller 106a determines to allow transaction host 102 to access first peripheral 104a unless both (a) AC_ID value=1 (restricted access setting) and (b) the operating mode signal value=0 (user mode).

According to the scheme of the second example described above, in one example instance, the transaction host 102 may initiate user mode tasks related to first peripheral 104a, and may thus program AC identifier 112a to 0 to initiate such tasks. If the first access controller 106a receives a request from the first peripheral device driver to access first peripheral 104a, the first access controller 106a may (a) access AC identifier 112a; (b) access operating mode signal 120; (c) perform an access determination to allow the first peripheral device driver access to first peripheral 104a if the operating mode signal 120 indicates either the user mode (operating mode signal value=0) or the privileged mode (operating mode signal value=1), and otherwise prevent the first peripheral device driver access to first peripheral 104a; and (d) allow, or prevent, the first peripheral device driver access to first peripheral 104a based on the access determination.

In another example instance, the transaction host 102 may initiate user mode tasks related to second peripheral 104b, using a second peripheral device driver corresponding with second peripheral 104b, and may thus program AC identifier 112b to 0 (i.e., open access to second peripheral 104b) and may program AC identifier 112a to 1 (i.e., restricted access to first peripheral 104a). If the first access controller 106a receives a request from the second peripheral device driver to access first peripheral 104a, the first access controller 106a may (a) access AC identifier 112a; (b) access operating mode signal 120; and (c) perform an access determination to allow or prevent to first peripheral 104a by the second peripheral device driver, in particular determine to allow access if the operating mode signal 120 indicates the privileged mode (operating mode signal value=1), and determine to prevent access if the operating mode signal 120 indicates the user mode (operating mode signal value=0); and (d) allow or prevent access to first peripheral 104a by the second peripheral device driver access based on the access determination.

Figure 3:
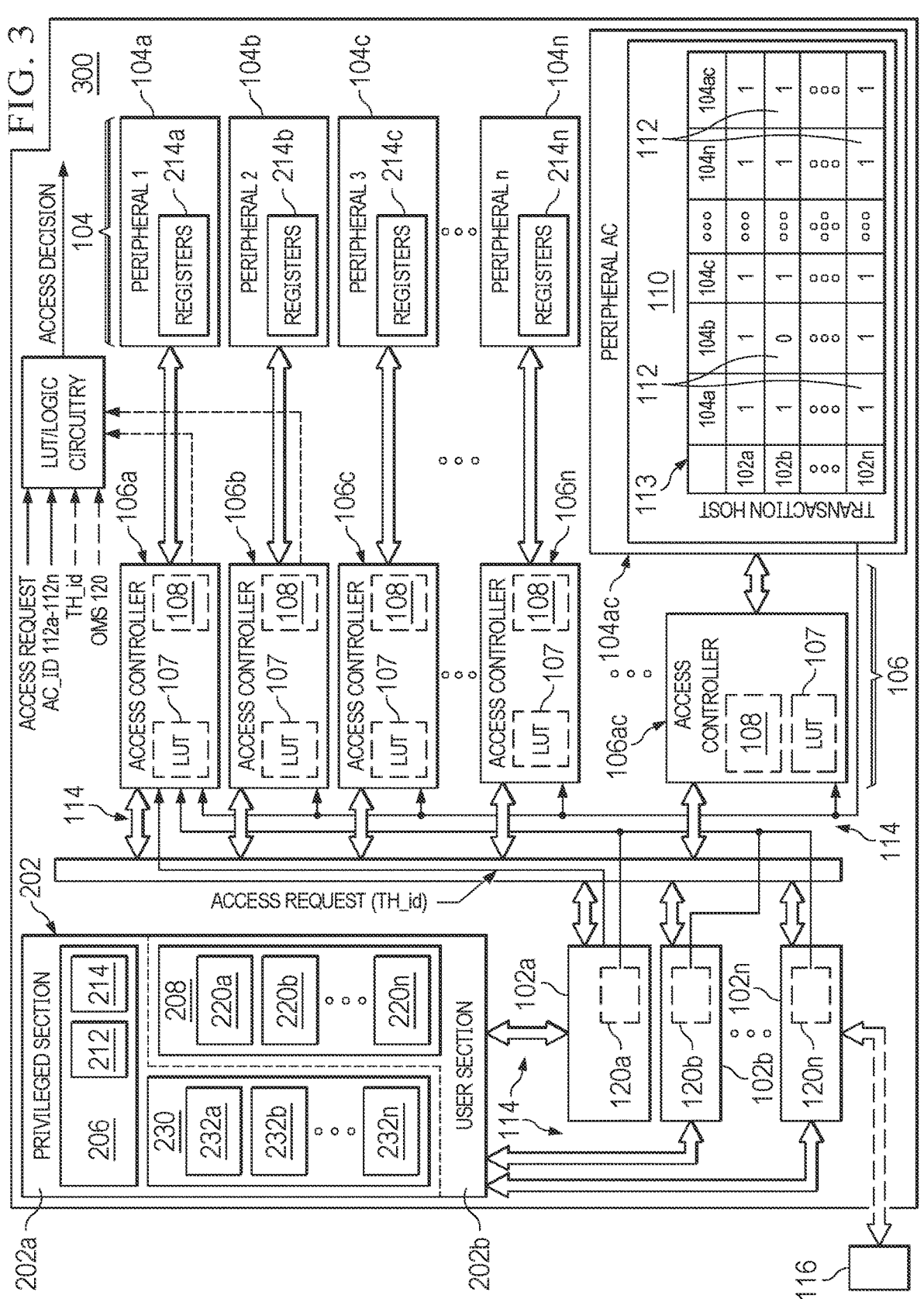
FIG. 3 illustrates another example electronic device that utilizes access control identifiers to control access to peripherals, according to one example.

As shown in FIG. 1, respective access controller 106a-106n may receive as inputs (a) an access request (ACR) for a respective peripheral 104a-104n, (b) a respective AC identifier 112a-112n, and (optionally) (c) an operating mode signal 120, and process the received inputs to make an access determination for the respective peripheral 104a-104n. For simplicity, the access request (ACR shown FIGS. 1-2 and TH_id shown in FIG. 3) and the optional operating mode signal (120 in FIGS. 1-2 and 120a-120n in FIG. 3) are illustrated in FIGS. 1-3 as being transmitted only to access controller 106a; it should be understood that access requests and optional operating mode signals may similarly be transmitted to access controllers 106b-106n for operations related to respective access controllers 106b-106n.

Figure 4A:
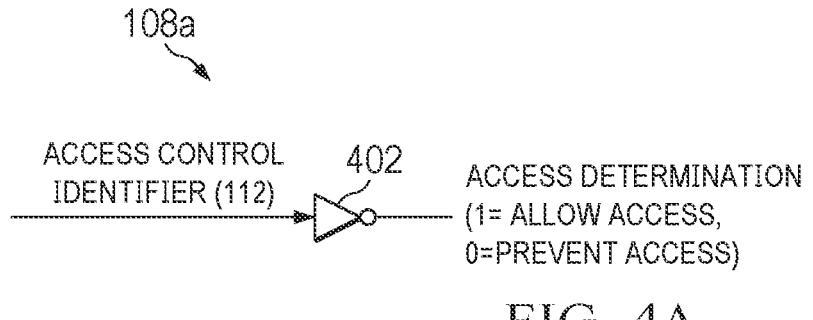
FIGS. 4A-4D show circuit diagrams of example logic circuitry provided in respective access controllers, according to some examples.
Figure 4B:
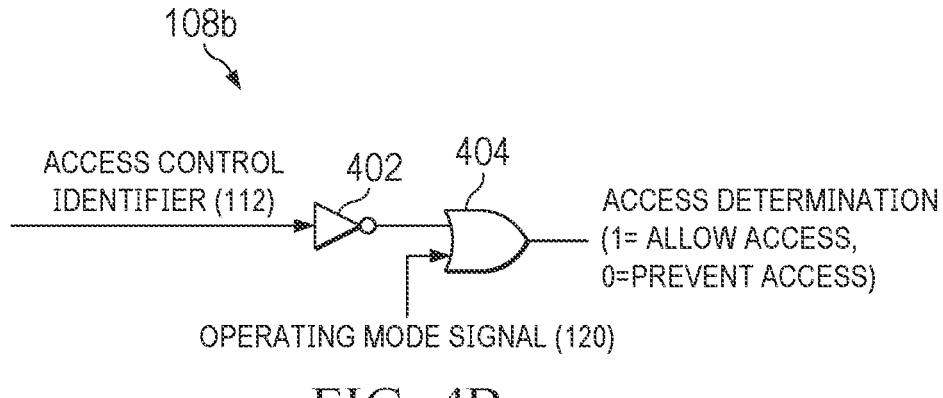

As discussed above, in some examples, respective access controllers 106a-106n of example electronic device 100 may include (or have access to) a respective lookup table (LUT) stored in memory 107 (e.g., ROM) defining a respective access determination for each AC_ID value (e.g., according to the scheme defined by Table 1 above) or defining a respective access determination each combinations of AC_ID value and operating mode signal value (e.g., according to the scheme defined by Table 2 above). In other examples, e.g., as shown in FIGS. 4A and 4B discussed below, respective access controller 106a-106n may comprise an instance of logic circuitry 108 including one or more logic gates, for example, a NOT gate (e.g., implementing the scheme defined by Table 1 above) or a NOT gate and an OR gate (e.g., implementing the scheme defined by Table 2 above).

In some examples, electronic device 100 may include AC identifier programming firmware executable by the transaction host 102 to dynamically program one, some or all AC identifiers 112a-112n, for example based on an operating mode of the transaction host and/or based on a respective peripheral 104a-104n selected for access (referred to herein as the access-requested peripheral 104a-104n), e.g., to initiate tasks related to the respective peripheral 104a-104n. In addition, in some examples, as discussed below with reference to FIG. 2, the access control register 110 is provided in a dedicated peripheral, which (like peripherals 104a-104n) may also be access-controlled by a respective access controller, e.g., wherein the AC identifier programming firmware can access the access control register 110 (e.g., to program AC identifiers 112a-112n) only in a privileged mode of transaction host 102, and not in a user mode of transaction host 102.

FIG. 2 illustrates additional features and aspects of electronic device (e.g., an SoC) 100 of FIG. 1, according to one example. As discussed above, electronic device 100 includes transaction host 102, peripherals 104a-104n, access controllers 106a-106n, and access control register 110 storing access control identifiers 112a-112n. Components of electronic device 100 may be communicatively connected to each other by any type or types of communication links 114, e.g., busses, wires, or other type of links. As discussed above, respective access controller 106a-106n utilizes respective access control identifiers 112a-112n (and optionally additional input data) to control access to respective peripherals 104a-104n, e.g., based on an operating mode (e.g., privileged mode or user mode) of the transaction host 102 and/or based on the access-requested peripheral 104a-104n (i.e., the peripheral 104a-104n for which access is requested). Access controller 106a-106n may implement any of the various example schemes discussed above, e.g., using the access control identifier scheme shown in Table 1 or Table 2 described above.

As shown in FIG. 2, access control register 110 including access control identifiers 112a-112n may be provided in a dedicated peripheral 104ac, and corresponding access controller 106ac may be provided to control access to peripheral 104ac, e.g., similar to access controller 106a-106n respectively controlling access to peripherals 104a-102n. For example, access controller 106ac may control access to peripheral 104ac based on an operating mode signal 120 from transaction host 102 and (optionally) a respective AC identifier 112ac. In some examples, access controller 106ac may control access to peripheral 104ac based on operating mode signal 120 from transaction host 102. In other examples, access controller 106ac may operate similar to access controller 106a-106n, for example based on a respective AC identifier 112ac and/or operating mode signal 120 and using an access control identifier scheme as shown in Table 1 or Table 2 described above.

As shown in FIG. 2, electronic device 100 may also include non-transitory memory 202 storing various firmware and other data. Non-transitory memory 202 (also referred to as memory 202) may include one or more read-only memory (ROM), for example flash ROM, erasable programmable ROM (EPROM), electrically erasable programmable ROM (EEPROM), flash memory, or any other suitable type(s) and number of memory device(s).

As shown, memory 202 may include a privileged section 202a and a non-privileged section (or user section) 202b. The non-privileged section 202b may store computer-readable user-space code 208, e.g., embodied in firmware, for example, device drivers associated with respective peripherals 104a-104n and/or other user-space firmware. User-space code (e.g., user-space firmware) 208 may include functions that need or can utilize access to only selected resources (e.g., selected ones of peripherals 104a-104n). For example, user-space code 208 may include device drivers or other firmware including respective tasks 220a-220n need or can utilize access to selected peripherals 104a-104n, e.g., to access data stored in respective registers 214a-214n provided in respective peripherals 104a-104n. Thus, device drivers, which conventionally operate as supervisor firmware, may be operated as user-space firmware having access only to selected resources (e.g., selected peripherals 104a-104n), to thereby provide increased security as described herein.

The privileged section 202a may store supervisor code (e.g., supervisor firmware) 206 and a bitmask data structure 230. The bitmask data structure 230 may include bitmasks 232a-232n respectively corresponding with tasks 230a-230n, wherein a respective bitmask 232n for a respective task 230n indicates respective access settings for respective peripherals 104a-104n, e.g., indicating whether the respective task 230n is assigned peripheral access permission to respective peripherals 104a-104n. For example, referring to FIG. 2, Task 1 bitmask 232a corresponding with "Task 1" 220a may indicate "Task 1" 220a is assigned peripheral access permission to first peripheral 104a but not to second peripheral 104b; and Task 2 bitmask 232b corresponding with "Task 2" 220b may indicate "Task 2" 220b is assigned peripheral access permission to second peripheral 104b but not to first peripheral 104a.

In some examples, a respective bitmask 232a-232n for a respective task 220a-220n may include one bit or multiple bits (also referred to herein as "bitmask bits") or other data indicating whether the respective task 220a-220n is assigned peripheral access permission to respective ones of peripherals 104a-104n. For example, Task 1 bitmask 232a corresponding with "Task 1" 220a may include one or more first bitmask bits or other data indicating "Task 1" 220a is assigned peripheral access permission to first peripheral 104a and one or more second bitmask bits or other data indicating "Task 1" 220a is not assigned peripheral access permission to second peripheral 104b.

Supervisor code (e.g., supervisor firmware) 206 may include a scheduler 212 and access control identifier management instructions 214. The scheduler 212 is executed by transaction host 102 to manage the execution of user-space code (e.g., user-space firmware) 208, e.g., including tasks 220a-220n. The access control identifier management instructions 214 are executable by the transaction host 102 to (a) access bitmasks 232a-232n and (b) program values of access control identifiers 112a-112n in the access control register 110 based on the respective bitmasks 232a-232n corresponding with respective tasks 220a-220n to be executed. In some examples, e.g., certain implementations of the first example access control identifier scheme described above (see Table 1), the transaction host 102 may utilize bitmasks 232a-232n for user-mode operations (e.g., executing respective tasks 220a-220n in a user mode) but not for privileged-mode operations (e.g., executing respective tasks 220a-220n in a privileged mode). (In other implementations of the first example access control identifier scheme (shown in Table 1), the transaction host 102 may utilize bitmasks 232a-232n for both user-mode and privileged-mode operations).

For example, before executing "Task 1" 220a, transaction host 102 may execute access control identifier management instructions 214 to program values of access control identifiers 112a-112n in the access control register 110 based on Task 1 bitmask 232a and/or based on the operating mode (e.g., privileged mode or user mode) of the transaction host 102. An example implementation under both the first example access control identifier scheme described above (see Table 1) and the second example access control identifier scheme described above (see Table 2) are provided.

Example 1: first example access control identifier scheme (Table 1). Under the first example access control identifier scheme described above (see Table 1), the transaction host 102 may utilize Task 1 bitmask 232a for executing "Task 1" 220a in a user mode, but not for executing "Task 1" 220a in a privileged mode. For example, before executing "Task 1" 220a in a user mode, transaction host 102 may execute access control identifier management instructions 214 to (a) identify "Task 1" 220a is to be performed in the user mode of the transaction host 102, (b) access the first bitmask 232a indicating "Task 1" 220a is assigned peripheral access permission to first peripheral 104a but not second peripheral 104b, and (c) based on the first bitmask 232a and the current operating mode (user mode), program the first access control identifier 112a to an access-allowed value (AC_ID value=0) allowing access to the first peripheral 104a during user-mode execution of "Task 1" 220a and (b) program the second access control identifier 112b to an access-prevented value (AC_ID value=0) preventing access to the second peripheral 104b during user-mode execution of "Task 1" 220a. In contrast, before executing "Task 1" 220a in a privileged mode (under the first example access control identifier scheme shown in Table 1 above), transaction host 102 may execute access control identifier management instructions 214 to program both the first access control identifier 112a and second access control identifier 112b to the access-allowed value (AC_ID value=0) allowing access to both the first peripheral 104a and second peripheral 104b during privileged-mode execution of "Task 1" 220a. In this situation the transaction host 102 may disregard Task 1 bitmask 232a, as all peripherals 104a-104n are to be accessible for privileged mode operations.

As noted above, in other examples that utilize the first example access control identifier scheme (shown in Table 1), the transaction host 102 may utilize bitmasks 232a-232n for both user-mode and privileged-mode operations.

Example 2: second example access control identifier scheme (Table 2). Under the second example access control identifier scheme described above (see Table 2), before executing "Task 1" 220a (in either the user mode or privileged mode), transaction host 102 may execute control bit management instructions 214 to (a) program the first access control identifier 112a to an open-access setting (AC_ID value=0) for the first peripheral 104a allowing access to the first peripheral 104a in both a privileged mode and a user mode of the transaction host 102, and (b) program the second access control identifier 112b to a restricted access setting (AC_ID value=1) for the second peripheral 104b allowing access to the second peripheral 104b in a privileged mode but not in a user mode of the transaction host 102.

FIG. 3 illustrates another example electronic device 300 that utilizes programmable access control identifiers to control access to peripherals, according to one example. Electronic device 300 may be generally similar to example electronic device 100 discussed above, but includes multiple transaction hosts 102a-102n, in addition to peripherals 104a-104n and 104ac, access controllers 106a-106n and 106ac, and access control register 110 within peripheral 104ac storing access control identifiers 112. Components of electronic device 100 may be communicatively connected to each other by any type or types of communication links 114, e.g., busses, wires, or other type of links.

Respective access controllers 106a-106n and 106ac may utilize respective access control identifiers 112 (and optionally additional input data) to control access to respective peripherals 104a-104n and 104ac, e.g., based on (a) the access-requested peripheral 104a-104n, (b) the respective transaction host 102a-102n requesting access to the access-requested peripheral 104a-104n (referred to herein as the access-requesting transaction host 102a-102n), and (b) an operating mode signal 120a-120n (e.g., privileged mode or user mode) of the access-requesting transaction host 102a-102n.

Access control register 110 may store an AC identifier array 113 including a respective set of AC identifiers 112 for respective transaction hosts 102a-102n, wherein the set of AC identifiers 112 for the respective transaction host 102a-102n includes a respective AC identifier 112 for the respective peripherals 104a-104n and (optionally) for peripheral 104ac. Table 3 below shows an example AC identifier array 113 for the multiple transaction hosts 102a-102n and multiple peripherals 104a-104n and 104ac.

TABLE 3

Example AC identifier array 113 for example electronic device 300 including multiple transaction hosts 102a-102n and multiple peripherals 104a-104n and 104ac.

| Transaction Host | Peripheral | | | | | |
|---|---|---|---|---|---|---|
| | 104a | 104b | 104c | 104n | . . . | 104ac |
| 102a | 1 | 1 | 1 | 1 | . . . | 1 |
| 102b | 1 | 0 | 1 | 1 | . . . | 1 |
| . . . | . . . | . . . | . . . | . . . | . . . | . . . |
| 102n | 1 | 1 | 1 | 1 | . . . | 1 |

The values of AC identifiers 112 in AC identifier array 113 may be used by respective access controller 106a-106n and 106ac to determine access to respective peripherals 104a-104n and 104ac by respective transaction hosts 102a-102n.

In one example, the values of AC identifiers 112 in AC identifier array 113 may indicate an access-allowed status (AC_ID value=0) or access-prevented status (AC_ID value=1), e.g., as discussed above regarding Table 1. In such an example, when an access-requesting transaction host 102a-102n attempts to access an access-requested peripheral 104a-104n or 104ac, the access controller 106a-106n or 106ac corresponding with the access-requested peripheral 104a-104n or 104ac may (a) receive an access request including a transaction host identifier (TH_id) from the access-requesting transaction host 102a-102n, (b) identify from the AC identifier array 113 stored in access control register 110 the value of the AC identifier 112 corresponding with the access-requesting transaction host 102a-102n (based on the received TH_id) and the access-requested peripheral 104a-104n or 104ac, and (c) perform an access determination to allow or prevent access to the access-requested peripheral 104a-104n or 104ac by the access-requesting transaction host 102a-102n based on the identified AC identifier 112 (i.e., allowing access if the AC_ID value=0, and preventing access if the AC_ID value=1), and (d) allow or prevent access to the access-requested peripheral 104a-104n or 104ac based on the access determination.

In another example, the values of AC identifiers 112 in AC identifier array 113 may indicate an open-access status (AC_ID value=0) or restricted-access status (AC_ID value=1), e.g., as discussed above regarding Table 2. In such example, when an access-requesting transaction host 102a-102n attempts to access an access-requested peripheral 104a-104n or 104ac, the access controller 106a-106n or 106ac corresponding with the access-requested peripheral 104a-104n or 104ac may (a) receive an access request including a TH_id from the access-requesting transaction host 102a-102n; (b) receive a respective operating mode signals 120a-120n from the access-requesting transaction host 102a-102n, indicating the operating mode (privileged mode or user mode) of the access-requesting transaction host 102a-102n; (c) identify from the AC identifier array 113 stored in access control register 110 the value of the AC identifier 112 corresponding with the access-requesting transaction host 102a-102n (based on the received TH_id) and access-requested peripheral 104a-104n or 104ac; (d) perform an access determination to allow or prevent access to the access-requested peripheral 104a-104n or 104ac by the access-requesting transaction host 102a-102n based on the value of the identified AC identifier 112 and the operating mode of the access-requesting transaction host 102a-102n, e.g., according to the scheme discussed above regarding Table 2; and (e) allow or prevent access to the access-requested peripheral 104a-104n or 104ac based on the access determination.

As discussed above, in some examples, respective access controllers 106a-106n of example electronic device 100 may comprise a respective instance of memory 107 storing a lookup table (LUT), or alternatively may comprise a respective instance of logic circuitry 108, to implement the access determination scheme defined by Table 1 or Table 2 above.

With respect to the latter, FIGS. 4A-4D show circuit diagrams of example logic circuitry 108 provided in respective access controllers 106a-106n (and optionally access controller 106ac), according to some examples.

First, FIGS. 4A and 4B show example logic circuitry 108 for an example electronic device including one transaction host 102, e.g., the example electronic device 100 shown in FIGS. 1 and 2.

FIG. 4A shows example logic circuitry 108a according to the first example discussed above, i.e., implementing the access control identifier scheme shown in Table 1 above. Logic circuitry 108a includes a NOT gate (or inverter) 402 that inverts the value of the respective access control identifier 112, and outputs a value defining an access determination.

FIG. 4B shows example logic circuitry 108b according to the second example discussed above, i.e., implementing the access control identifier scheme shown in Table 2 above. Logic circuitry 108b includes a NOT gate (or inverter) 402 that inverts the value of the respective access control identifier 112, and an OR gate 404 that processes the value output by the NOT gate 402 along with the operating mode signal 120, and outputs a value defining an access determination.

Figure 4C:
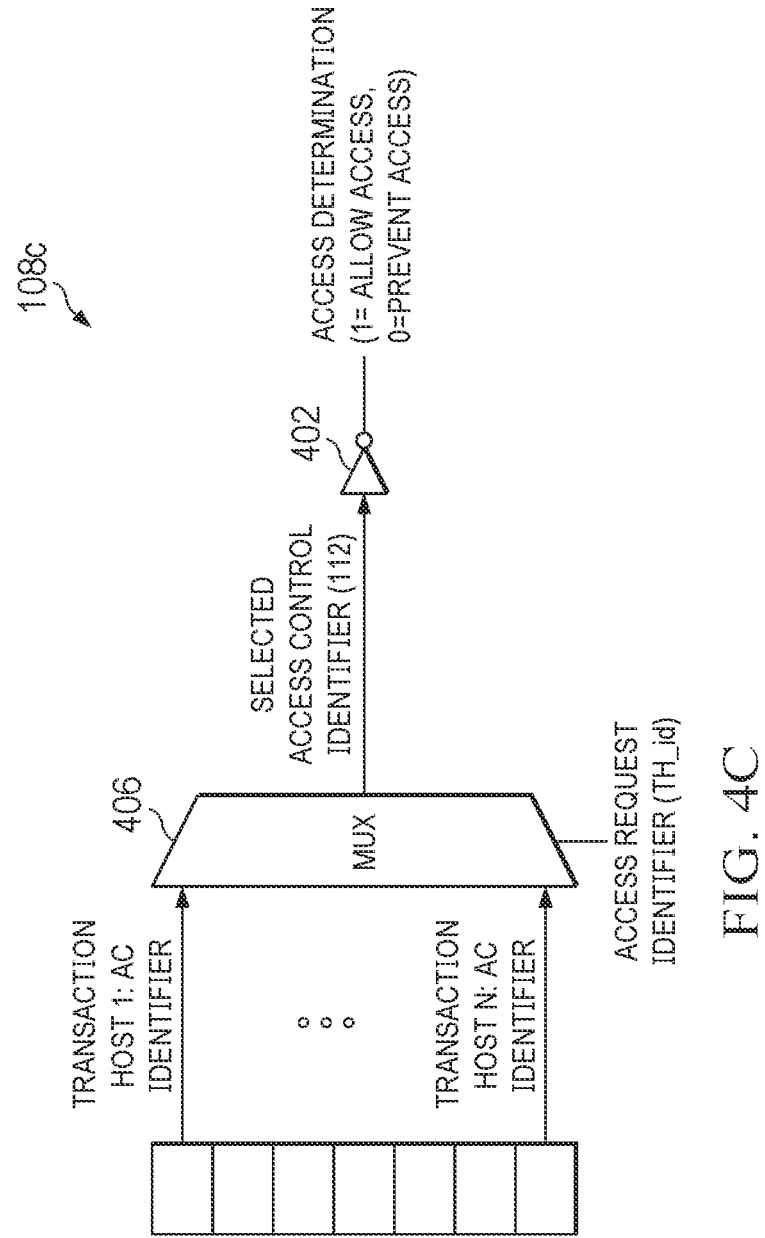
Figure 4D:
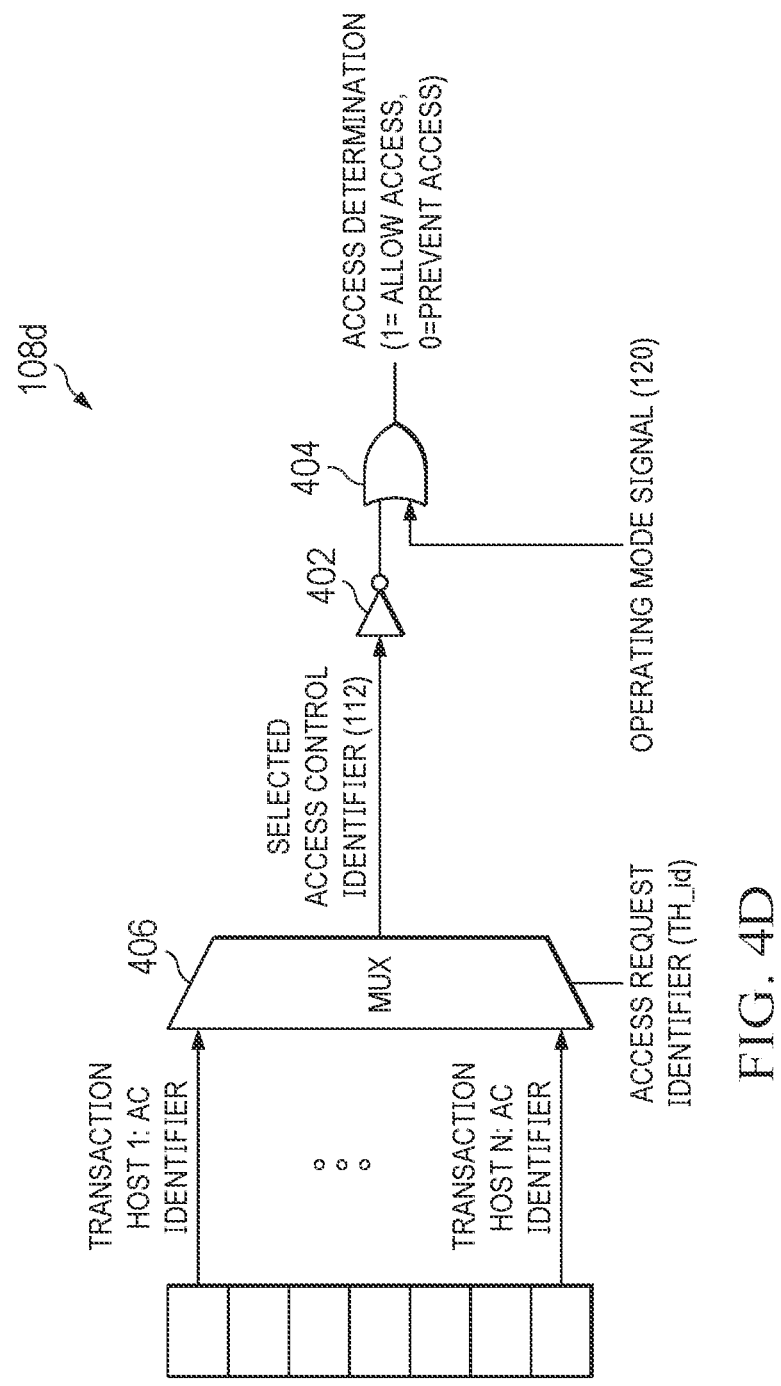

Next, FIGS. 4C and 4D show example logic circuitry 108 for an example electronic device including multiple transaction hosts 102, e.g., the example electronic device 300 shown in FIG. 3.

FIG. 4C shows example logic circuitry 108c according to the first example discussed above, i.e., implementing the access control identifier scheme shown in Table 1 above, with multiple transaction hosts 102. Logic circuitry 108c includes a multiplexer (MUX) 406 that receives (a) values of AC identifiers 112 for respective transaction hosts 102 and (b) an access request identifier (TH_id) that identifies a respective transaction host 102 requesting access to a respective peripheral 104, and selects the value of the respective AC identifier 112 associated with the respective transaction host 102 responsive to the access request identifier (TH_id), which selected AC_ID value is forwarded to a NOT gate (or inverter) 402 that inverts the AC_ID value, and outputs a value defining an access determination.

In other examples, the meaning of the example AC_ID values set forth in Table 1, Table 2, and/or Table 3 may be reversed, e.g., wherein AC_ID=0 indicates an access-prevented or restricted-access setting and AC_ID=1 indicates an access-allowed or open-access setting. In such examples, the NOT gate (inverter) 402 may be omitted from the logic circuitry 108a-108d shown in FIGS. 4A-4D.

FIG. 4D shows example logic circuitry 108d according to the second example discussed above, i.e., implementing the access control identifier scheme shown in Table 2 above. Logic circuitry 108d includes a multiplexer (MUX) 406 that receives (a) values of AC identifiers 112 for respective transaction hosts 102 and (b) an access request identifier (TH_id) that identifies a respective transaction host 102 requesting access to a respective peripheral 104, and selects the value of the respective AC identifier 112 associated with the respective transaction host 102 responsive to the access request identifier (TH_id), which selected AC_ID value is forwarded to a NOT gate 402 that inverts the AC_ID value. Logic circuitry 108d further includes an OR gate 404 that processes the value output by the NOT gate 402 along with the operating mode signal 120 of the respective transaction host 102, and outputs a value defining an access determination.

FIG. 5 is a flowchart of an example method 500 for controlling access to peripherals in an electronic device including a transaction host, a first peripheral, a second peripheral, and an access control register. In some examples, the electronic device may be the example electronic device 100 or electronic device 300 discussed above. At 502, a first access control identifier for the first peripheral and a second access control identifier for the second peripheral are stored in the access control register. For example, the first access control identifier and second access control identifier may be programmed by the transaction host before executing a respective task (e.g., a device driver task), e.g., based on an operating mode of the transaction host and/or based on a respective peripheral (e.g., the first peripheral, the second peripheral, or another peripheral) to be accessed for performing the respective task.

At 504, during the execution of the respective task, the first access controller associated with the first peripheral receives a request from the transaction host for access to the first peripheral. For example, the transaction host may be executing a device driver task corresponding with the first peripheral. In some examples, the access request from the transaction host optionally includes an operating mode signal indicating a privileged mode or a user mode of the transaction host.

At 506, the first access controller accesses the first access control identifier for the first peripheral from the access control register. At 508, the first access controller performs an access determination to alternately allow, or prevent, access to the first peripheral by the transaction host based at least on the accessed first access control identifier for the first peripheral, for example using a respective LUT stored in memory or using respective logic circuitry, e.g., as shown in any of FIGS. 4A-4D. For example, the first access controller may perform an access determination according to the access control identifier scheme described above regarding Table 1. In some examples, the first access controller may also use the optionally received operating mode signal (see above at 504) as another input for the access determination. For example, the first access controller may perform an access determination according to the access control identifier scheme described above regarding Table 2, based on the first access control identifier and the operating mode indicated by the optional operating mode signal.

At 510, the first access controller allows or prevents access to the first peripheral based on the access determination. For example, to prevent access to the first peripheral, the first access controller may force a "chip-select" signal (also referred to as a "peripheral-select" signal) associated with the requested transaction from value=1 (indicating the first peripheral is targeted/selected) to value=0 (indicating the first peripheral is not targeted/selected), such that the first peripheral ignores the transaction. Alternatively, to allow access to the first peripheral, the first access controller may leave the chip-select signal value unchanged (value=1), such that the first peripheral processes the transaction, or force the chip-select signal associated with the requested transaction from value=0 to value=1. (In alternative examples, other chip-select signal values may be defined for denoting whether a respective peripheral is targeted/selected. For example, a system may define chip-select signal value=0 indicates a peripheral is targeted/selected, while chip-select signal value=1 indicates the peripheral is not targeted/ selected).

FIG. 6 is a flowchart of an example method 600 for controlling access to peripherals in an electronic device including a transaction host, multiple peripherals, and an access control register storing respective access control identifiers (AC identifiers) for the multiple peripherals. In some examples, the electronic device may be the example electronic device 100 or electronic device 300 discussed above, and method 600 may correspond with the access control identifier scheme discussed above regarding Table 1.

At 602, the transaction host programs the AC identifiers for the multiple peripherals, e.g., based on a planned operation of the transaction host. In this example, for privileged mode operations, the transaction host sets the AC identifier for the respective peripherals to an access-allowed setting (AC_ID value=0) allowing access to the respective peripherals by the transaction host. In some examples, the transaction host may execute access control identifier management instructions provided in supervisor firmware to access and program the AC identifiers. In some examples the transaction host may disregard bitmasks when setting AC identifiers for privileged mode operations, as all peripherals are to be accessible during privileged mode operations.

At 604, the transaction host operates in the privileged mode, e.g., by executing relevant supervisor code, e.g., supervisor firmware. At 606, while the transaction host operates in the privileged mode, respective access controllers corresponding with respective peripherals of the multiple peripherals allows access to the respective peripherals, based on the access-allowed setting (AC_ID value=0) of the respective AC identifiers for the respective peripherals, for example using a respective LUT stored in memory or using respective logic circuitry, e.g., as shown in FIG. 4A (single transaction host scenario) or FIG. 4C (multiple transaction host scenario).

At 608, while the transaction host operates in the privileged mode (with AC identifiers programmed to 0), supervisor firmware executed by the transaction host identifies a respective task related to a selected peripheral ("peripheral N") to be performed in a user mode. At 610, before performing the respective task related to peripheral N, transaction host accesses a respective bitmask associated with the respective task, which respective bitmask indicates access settings for multiple peripherals (including peripheral N) for performing the respective task, and programs the AC identifiers for the multiple peripherals based on the respective bitmask. In this example, the transaction host (a) programs the AC identifier for peripheral N to the access-allowed setting (AC_ID value=0) allowing access to peripheral N during user-mode execution of the respective task and (b) programs the AC identifiers for the other peripherals of the multiple peripherals to an access-prevented setting (AC_ID value=1) preventing access to each respective peripheral during user-mode execution of the respective task.

At 612, the transaction host transitions from the privileged mode to a user mode, and performs the respective task related to peripheral N. At 614, to perform the respective task related to peripheral N, access controller corresponding with peripheral N allows access to peripheral N (e.g., to access registers in peripheral N), based on the access-allowed setting (AC_ID value=0) of the AC identifier for peripheral N (as programmed based on the respective bitmask associated with the respective task), for example using a respective LUT stored in memory or using respective logic circuitry, e.g., as shown in FIG. 4A (single transaction host scenario) or FIG. 4C (multiple transaction host scenario). If the transaction host attempts to access any of the other peripherals, access controller corresponding with the respective other peripheral prevents access to the other peripheral, based on the access-prevented setting (AC_ID value=1) of the respective AC identifier for the other peripheral, for example using the respective LUT or logic circuitry, e.g., as shown in FIG. 4A or FIG. 4C.

At 616, the transaction host completes the respective task related to peripheral N. At 618, the transaction host may identify a next transaction host activity to perform in the user mode. For example, as indicated at 620, if supervisor firmware executed by the transaction host identifies a next peripheral-related task (related to the same peripheral or another peripheral) to be performed in user mode, the method may return to 610, wherein the transaction host programs the AC identifiers accordingly for performing the next task (e.g., based on a respective bitmask associated with the next task). As another example, as indicated at 622, if supervisor firmware executed by the transaction host identifies supervisor or privileged operations to be performed, the method may return to 602, wherein the transaction host (optionally) programs the AC identifiers for the multiple peripherals to the access-allowed setting (AC_ID value=0) (e.g., disregarding respective bitmasks) to allow access to the respective peripherals by the transaction host during the supervisor or privileged operations, as discussed above. In some examples or situations, it may be superfluous to program the AC identifiers for supervisor or privileged operations (as the transaction host running supervisor code may have access to all registers), and thus the AC identifier programming at 602 may be omitted or optional.

Figure 7:
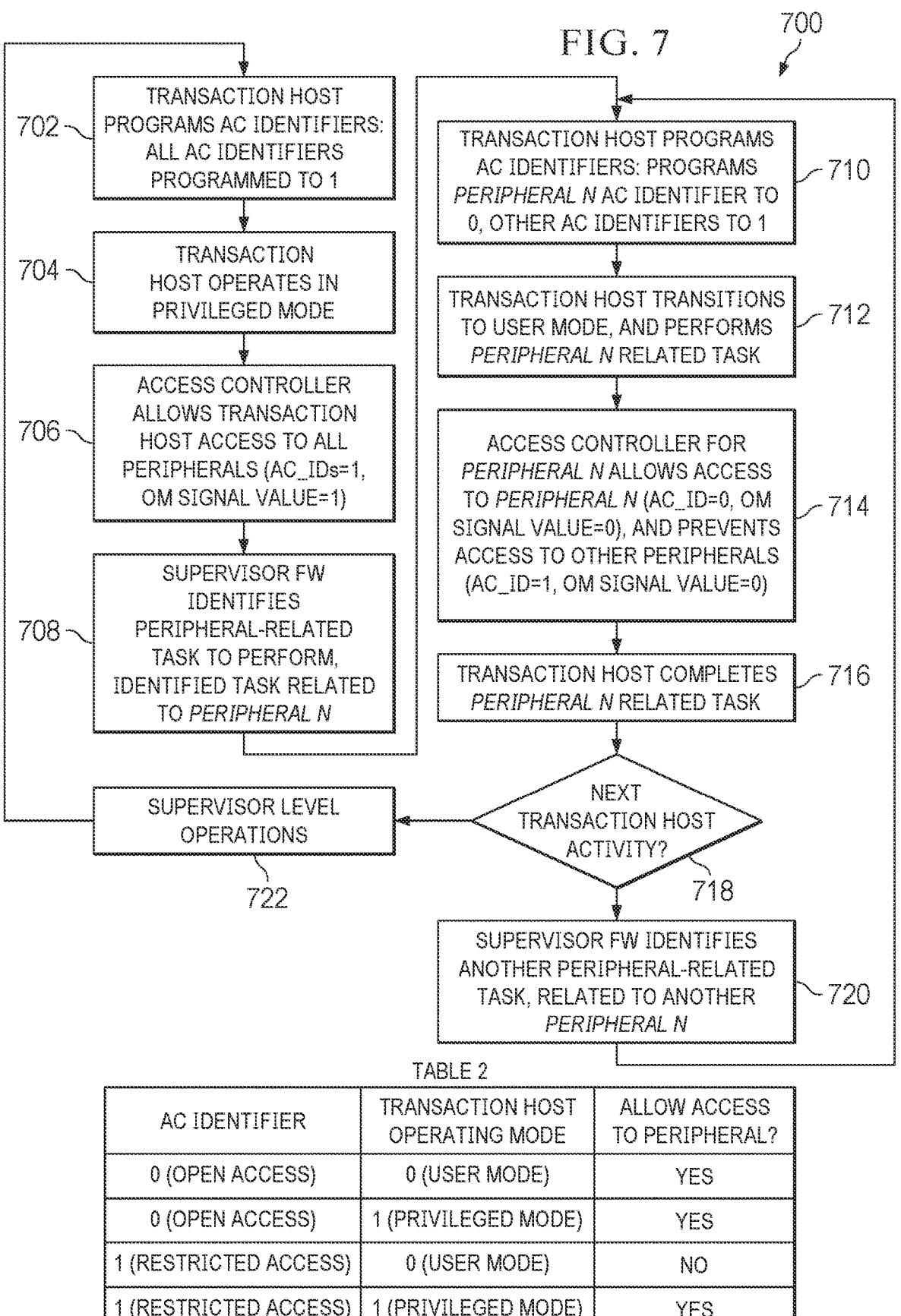
FIG. 7 is a flowchart of an example method for controlling access to peripherals in an electronic device, using a second example access control identifier scheme.

FIG. 7 is a flowchart of an example method 700 for controlling access to peripherals in an electronic device including a transaction host, multiple peripherals, and an access control register storing respective access control identifiers (AC identifiers) for the multiple peripherals. In some examples, the electronic device may be the example electronic device 100 or example electronic device 300 discussed above, and method 700 may correspond with the access control identifier scheme discussed above regarding Table 2.

At 702, the transaction host programs the AC identifiers for the multiple peripherals, e.g., based on a planned operation of the transaction host. In this example, for privileged mode operations, the transaction host sets the AC identifier for the respective peripherals to a restricted-access setting (AC_ID value=1). In some examples, the transaction host may execute access control identifier management instructions provided in supervisor firmware to access and program the AC identifiers.

At 704, the transaction host operates in the privileged mode, e.g., by executing relevant supervisor firmware. At 706, while the transaction host operates in the privileged mode (with AC identifiers programmed to 1), respective access controller corresponding with respective peripherals of the multiple peripherals allows access to the respective peripherals, for example using a respective LUT stored in memory or using respective logic circuitry, e.g., as shown in FIG. 4B (single transaction host scenario) or FIG. 4D (multiple transaction host scenario). Each request by the transaction host to access a respective peripheral may include an operating mode signal indicating the privileged mode of the transaction host (e.g., operating mode signal value=1, per the control bit scheme shown in Table 2). For the respective request by the transaction host to access a respective peripheral, the respective access controller corresponding with the respective peripheral may determine whether to allow or prevent access to the respective peripheral based on (a) the respective AC identifier for the respective peripheral and (optionally in a multiple transaction host scenario) the respective transaction host and (b) the operating mode signal indicating the privileged mode (e.g., operating mode signal value=1), according to the control bit scheme shown above in Table 2. More particularly, the respective access controller allows access to the respective peripheral based on the privileged mode of the respective transaction host (e.g., operating mode signal value=1).

At 708, while the transaction host operates in the privileged mode, supervisor firmware executed by the transaction host identifies a respective task to be performed related to a selected peripheral ("peripheral N") of the multiple peripherals in a user mode. At 710, before performing the respective task related to peripheral N in the user mode, the transaction host accesses a respective bitmask associated with the respective task, which respective bitmask indicates access settings for multiple peripherals (including peripheral N) for performing the respective task, and programs the AC identifiers for the multiple peripherals associated with the transaction host based on the respective bitmask. In this example, the transaction host (a) programs the AC identifier for peripheral N to the open-allowed setting (AC_ID value=0) and (b) programs the AC identifiers for the other peripherals of the multiple peripherals, associated with the transaction host, to a restricted-access setting (AC_ID value=1), according to the control bit scheme shown above in Table 2.

At 712, the transaction host transitions from the privileged mode to a user mode, and performs the respective task related to peripheral N. At 714, to perform the respective task related to peripheral N, access controller corresponding with peripheral N allows access to peripheral N (e.g., to access registers in peripheral N), based on (a) the open-access setting (AC_ID value=0), for example using a respective LUT stored in memory or using respective logic circuitry, e.g., as shown in FIG. 4B (single transaction host scenario) or FIG. 4D (multiple transaction host scenario). If the transaction host attempts to access any of the other peripherals, respective access controller corresponding with the other peripheral prevents access to the other peripheral, based on (a) the restricted-access setting (AC_ID value=1) and (b) the user mode of the transaction host (operating mode signal value=0), according to Table 2, for example using a respective LUT or logic circuitry, e.g., as shown in FIG. 4B or FIG. 4D.

At 716, the transaction host completes the respective task related to peripheral N in the user mode. At 718, the transaction host may identify a next transaction host activity to perform. For example, as indicated at 720, if supervisor firmware executed by the transaction host identifies a next peripheral-related task (related to the same peripheral or another peripheral) to be performed in the user mode, the method may return to 710, wherein the transaction host programs the AC identifiers accordingly for performing the next task (e.g., based on a respective bitmask associated with the next task). As another example, as indicated at 722, if supervisor firmware executed by the transaction host identifies supervisor or privileged operations to be performed in the privileged mode, the method may return to 702, wherein the transaction host programs the AC identifiers for the multiple peripherals to the restricted-access setting (AC_ID value=1), as discussed above.

FIG. 8 is a flowchart of an example method 800 for controlling access to peripherals in an electronic device including a transaction host, a first peripheral, a second peripheral, and an access control register storing respective access control identifiers (AC identifiers). In some examples, the electronic device may be the example electronic device 100 or electronic device 300 discussed above, and method 800 may correspond with the access control identifier scheme discussed above regarding any of Table 1, Table 2, or Table 3 described above, for example.

At 802, a first access control identifier for the first peripheral and a second access control identifier for the second peripheral are stored in the access control register. The transaction host may dynamically program the first access control identifier and second access control identifier over time for performing different types of operations, e.g., privileged mode operations and user mode operations, including operations related to the first and second peripherals. In some examples the transaction host may execute access control identifier management instructions provided in supervisory firmware to dynamically program the first and second access control identifiers before executing respective tasks (e.g., device driver tasks).

For example, at 804, for privileged mode operations, the transaction host sets the first access control identifier and second access control identifier to allow access to the first peripheral and the second peripheral, respectively. In some examples or situations, it may be superfluous to program the AC identifiers for privileged mode operations (as the transaction host running supervisor code may have access to all registers), and thus the AC identifier programming at 804 may be omitted or optional. In some examples, the transaction host sets the first and second access control identifiers according to an access bit scheme as discussed above regarding any of Table 1, Table 2, or Table 3 described above. At 806, the transaction host performs privileged mode operations at a first time, thus at 806 the operating mode signal is indicative of privileged mode.

At 808, for a user mode operations (user-mode task) related to the first peripheral, the transaction host accesses a respective bitmask associated with the user-mode task, which bitmask indicates access settings for at least the first and second peripherals, and programs the AC identifiers for at least the first and second peripherals based on the respective bitmask. In this example, the transaction host (a) sets the first access control identifier to allow access to the first peripheral by the transaction host in user-mode, and (b) sets the second access control identifier to prevent access to the second peripheral by the transaction host in user-mode. In some examples, the transaction host sets the first and second access control identifiers according to an access bit scheme as discussed above regarding any of Table 1, Table 2, or Table 3 described above. At 810, the transaction host performs the user-mode task related to the first peripheral at a second time, thus at 810 the operating mode signal is indicative of user-mode.

The transaction host may continue to dynamically program the first and second access control identifiers over time in this manner, for performing different types of operations, e.g., privileged mode operations and user mode operations, including operations related to the first and second peripherals.

Figure 9:
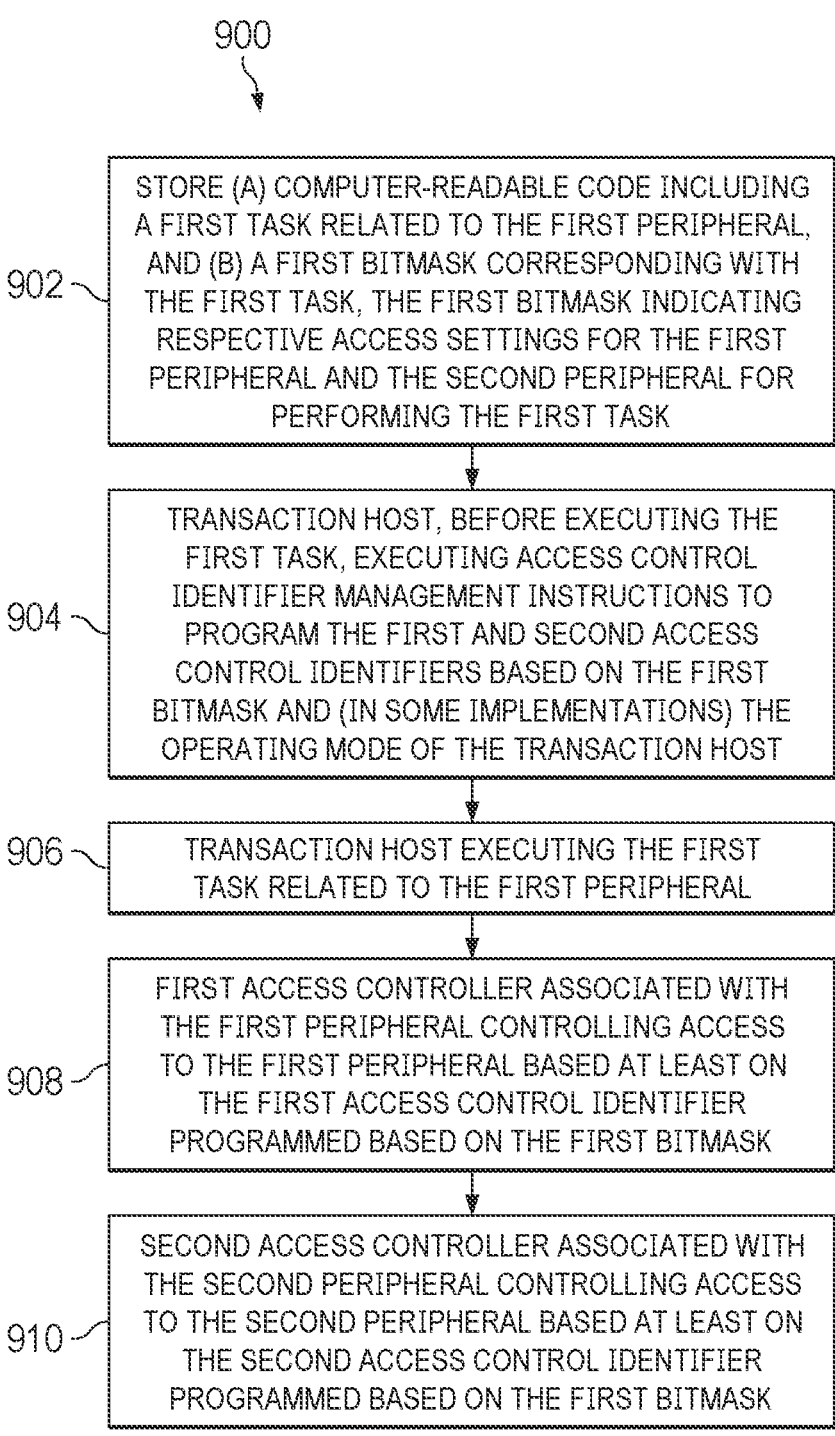
FIG. 9 is a flowchart of an example method for controlling access to peripherals using a task-related bitmask.

FIG. 9 is a flowchart of an example method 900 for controlling access to peripherals using a task-related bitmask, in an electronic device including a transaction host, a first peripheral, a second peripheral and an access control register including a first access control identifier for the first peripheral and a second access control identifier for the second peripheral. At 902, computer-readable code including a first task related to the first peripheral, and a first bitmask corresponding with the first task, are stored, wherein the first bitmask indicates respective access settings for the first peripheral and the second peripheral for performing the first task. At 904, the transaction host, before executing the first task, executes access control identifier management instructions to program the first and second access control identifiers in the access control register based on (a) the first bitmask corresponding with the first task, and in some implementations (b) the operating mode of the transaction host. At 906, after updating the first and second access control identifiers in the access control register, the transaction host executes the first task related to the first peripheral. At 908, during execution of the first task, a first access controller associated with the first peripheral controlling access to the first peripheral based at least on the first access control identifier in the access control register programmed based on the first bitmask. At 910, also during execution of the first task, a second access controller associated with the second peripheral controlling access to the second peripheral based at least on the second access control identifier in the access control register programmed based on the first bitmask.

The invention claimed is:

1. An electronic device, comprising:
a transaction host;
a first peripheral;
a second peripheral;
a first access controller connected to the first peripheral;
a second access controller connected to the second peripheral;
an access control register storing a first access control identifier for the first peripheral and a second access control identifier for the second peripheral;

wherein the first access controller to:
receive an access request for access to the first peripheral by the transaction host;
perform an access determination for the first peripheral based at least on the first access control identifier for the first peripheral; and
allow or prevent the transaction host access to the first peripheral based on the access determination; and
firmware executable by the transaction host to program the first and second access control identifiers, including:
for a privileged mode operation of the transaction host, to program both the first and second access control identifiers to an access-allowed setting to allow access to both the first peripheral and the second peripheral by the transaction host;
for a first user mode operation of the transaction host to perform operations related to the first peripheral, to program the first access control identifier to the access-allowed setting to allow access to the first peripheral and to program the second access control identifier to an access-prevented setting to prevent access to the second peripheral; and
for a second user mode operation of the transaction host to perform operations related to the second peripheral, to program the first access control identifier to the access-prevented setting to prevent access to the first peripheral and to program the second access control identifier to an access-allowed setting to allow access to the second peripheral.

2. The electronic device of claim 1, wherein the transaction host comprises a processor or a direct memory access (DMA) engine.

3. The electronic device of claim 1, wherein the transaction host comprises a bridge to receive requests from an external host separate from the electronic device to access the first peripheral.

4. The electronic device of claim 1, wherein the first access control identifier includes one or more first access control bits, and the second access control identifier includes one or more second first access control bits.

5. The electronic device of claim 1, comprising firmware executable by the transaction host to program at least one of the first access control identifier and the second access control identifier based on an operating mode of the transaction host.

6. The electronic device of claim 1, comprising firmware executable by the transaction host to program at least one of the first access control identifier for the first peripheral and the second access control identifier for the second peripheral between (a) an access-allowed setting allowing access to the respective peripheral by the transaction host and (b) an access-prevented setting preventing access to the respective peripheral by the transaction host.

7. The electronic device of claim 1, wherein the access controller to perform an access determination for the first peripheral based at least on (a) the first access control identifier for the first peripheral and (b) an operating mode signal indicating either a privileged mode of the transaction host or a user mode of the transaction host.

8. The electronic device of claim 1, wherein the first access control identifier for the first peripheral and the second access control identifier for the second peripheral respectively indicate either:
(a) a restricted access setting to allow access to the respective peripheral only in a privileged mode of the transaction host, or (b) an open access setting to allow access to the respective peripheral in both the privileged mode of the transaction host and a user mode of the transaction host.

9. The electronic device of claim 8, comprising firmware executable by the transaction host to dynamically program at least one of the first access control identifier and the second access control identifier between the restricted access setting and the open access setting.

10. The electronic device of claim 8, wherein the access controller to perform the access determination as:

determine to allow access to the first peripheral if the first access control identifier for the first peripheral indicates the open access setting, and the operating mode signal indicates the privileged mode of the transaction host;

determine to allow access to the first peripheral if the first access control identifier for the first peripheral indicates the open access setting, and the operating mode signal indicates the user mode of the transaction host;

determine to allow access to the first peripheral if the first access control identifier for the first peripheral indicates the restricted access setting, and the operating mode signal indicates the privileged mode of the transaction host; and determine to prevent access to the first peripheral if the first access control identifier for the first peripheral indicates the restricted access setting, and the operating mode signal indicates the user mode of the transaction host.

11. The electronic device of claim 1, wherein:

the transaction host is selectively operatable in a privileged mode and a user mode; and at least one of the first access control identifier and the second access control identifier is programmable only in the privileged mode of the transaction host.

12. The electronic device of claim 1, comprising an additional transaction host;

wherein the first access control identifier and the second access control identifier are associated with the transaction host;

wherein the access control register stores a third access control identifier for the first peripheral and associated with the additional transaction host, and a fourth access control identifier for the second peripheral and associated with the additional transaction host;

wherein the access controller to:

receive an additional access request for access to the first peripheral by the additional transaction host;

perform an additional access determination for the first peripheral based on (a) an access request identifier identifying the additional transaction host, (b) the third access control identifier; and allow or prevent access to the first peripheral by the additional transaction host based on the additional access determination.

13. A method, comprising:

in an electronic device including a transaction host, a first peripheral, a second peripheral, and an access control register, storing in the access control register (a) a first access control identifier for the first peripheral and (b) a second access control identifier for the second peripheral;

executing firmware, by the transaction host, to program the first and second access control identifiers, including:

for a privileged mode operation of the transaction host, setting both the first and second access control identifiers to an access-allowed setting respectively allowing access to both the first peripheral and the second peripheral by the transaction host;

for a first user mode operation of the transaction host for performing operations related to the first peripheral, setting the first access control identifier to the access-allowed setting and setting the second access control identifier to an access-prevented setting preventing access to the second peripheral; and for a second user mode operation of the transaction host for performing operations related to the second peripheral, setting the first access control identifier to the access-prevented setting and setting the second access control identifier to an access-allowed setting;

receiving, by a first access controller associated with the first peripheral, a request for access to the first peripheral by the transaction host;

performing an access determination, by the first access controller, to allow or prevent access to the first peripheral based at least on (a) the first access control identifier for the first peripheral and (b) an operating mode signal indicating either the privileged mode operation, the first user mode operation, or the second user mode operation; and allowing or preventing access to the first peripheral based on the access determination.

14. The method of claim 13, comprising executing firmware, by the transaction host, to program at least one of the first access control identifier and the second access control identifier based on an operating mode of the transaction host.

15. The method of claim 13, comprising executing firmware, by the transaction host, to dynamically program at least one of the first access control identifier for the first peripheral and the second access control identifier for the second peripheral between (a) an access-allowed setting allowing access to the respective peripheral by the transaction host and (b) an access-prevented setting preventing access to the respective peripheral by the transaction host.

16. The method of claim 13, wherein the first access control identifier for the first peripheral and the second access control identifier for the second peripheral respectively indicate either:

(a) a restricted access setting preventing access to the respective peripheral in the user mode of the transaction host, or (b) an open access setting allowing access to the respective peripheral in both the privileged mode of the transaction host and the user mode of the transaction host.

17. The method of claim 16, wherein performing the access determination to allow or prevent access to the first peripheral comprises:

allowing access to the first peripheral if the peripheral-specific access control identifier for the first peripheral indicates the open access setting, and the operating mode signal indicates the privileged mode of the transaction host;

allowing access to the first peripheral if the first access control identifier for the first peripheral indicates the open access setting, and the operating mode signal indicates the user mode of the transaction host;

allowing access to the first peripheral if the first access control identifier for the first peripheral indicates the restricted access setting, and the operating mode signal indicates the privileged mode of the transaction host; and preventing access to the first peripheral if the first access control identifier for the first peripheral indicates the restricted access setting, and the operating mode signal indicates the user mode of the transaction host.

18. A method, comprising:

in an electronic device including a transaction host, a first peripheral, a second peripheral and an access control register, storing in the access control register a first access control identifier for the first peripheral and a second access control identifier for the second peripheral;

the transaction host setting the first access control identifier and the second access control identifier to allow access to the first peripheral and the second peripheral, respectively;

to perform a privileged mode operation at a first time, the transaction host executing firmware to set both the first and second access control identifiers to an access-allowed setting to allow access to both the first peripheral and the second peripheral by the transaction host;

to perform a first user mode operation related to the first peripheral at a second time, the transaction host executing the firmware to:

program the first access control identifier to an access-allowed setting to allow access to the first peripheral by the transaction host; and program the second access control identifier to an access-prevented setting to prevent access to the second peripheral by the transaction host; and to perform a second user mode operation related to the second peripheral at a third time, the transaction host executing the firmware to:

program the first access control identifier to an access-prevented setting to prevent access to the first peripheral by the transaction host; and program the second access control identifier to an access-allowed setting to allow access to the second peripheral by the transaction host.

* * * * *